United States Patent
Yang

(10) Patent No.: US 11,468,374 B2
(45) Date of Patent: Oct. 11, 2022

(54) METHODS AND SYSTEMS FOR CARPOOL SERVICES

(71) Applicant: BEIJING DIDI INFINITY TECHNOLOGY AND DEVELOPMENT CO., LTD., Beijing (CN)

(72) Inventor: Baotong Yang, Beijing (CN)

(73) Assignee: BEIJING DIDI INFINITY TECHNOLOGY AND DEVELOPMENT CO., LTD., Beijing (CN)

(*) Notice: Subject to any disclaimer, the term of this patent is extended or adjusted under 35 U.S.C. 154(b) by 75 days.

(21) Appl. No.: 16/690,327

(22) Filed: Nov. 21, 2019

(65) Prior Publication Data
US 2020/0090083 A1    Mar. 19, 2020

Related U.S. Application Data

(63) Continuation of application No. PCT/CN2017/108656, filed on Oct. 31, 2017.

(51) Int. Cl.
G06Q 10/02    (2012.01)
G01C 21/34    (2006.01)
G06Q 50/30    (2012.01)

(52) U.S. Cl.
CPC ......... *G06Q 10/02* (2013.01); *G01C 21/3438* (2013.01); *G06Q 50/30* (2013.01)

(58) Field of Classification Search
CPC ..... G06Q 10/02; G06Q 50/30; G01C 21/3438
See application file for complete search history.

(56) References Cited

U.S. PATENT DOCUMENTS

2004/0267449 A1   12/2004   Adamczyk
2008/0270204 A1   10/2008   Poykko et al.
(Continued)

FOREIGN PATENT DOCUMENTS

CN    101216913 A    7/2008
CN    102632593 A    9/2012
(Continued)

OTHER PUBLICATIONS

Hsieh, F. S., "Car Pooling Based on Trajectories of Drivers and Requirements of Passengers," 2017 IEEE 31st International Conference on Advanced Information Networking and Applications (AINA), 2017, pp. 972-978, doi: 10.1109/AINA.2017.41. (Year: 2017).*

(Continued)

*Primary Examiner* — Jeff Zimmerman
*Assistant Examiner* — Wayne S. Murray
(74) *Attorney, Agent, or Firm* — Metis IP LLC

(57) ABSTRACT

A method for carpool services includes obtaining a pending transportation service requested by a service requester. The pending transportation service may include a first origin and a first destination. The method may also include determining a first pick-up location and a first departure time from the first pick-up location for the pending transportation service based on the first origin and the first destination. The method may also include determining a target service provider based on the pending transportation service and a shareable transportation service that has been accepted by the target service provider and has not been completed.

20 Claims, 11 Drawing Sheets

(56) References Cited

U.S. PATENT DOCUMENTS

| | | |
|---|---|---|
| 2010/0207812 A1 | 8/2010 | Demirdjian et al. |
| 2013/0096827 A1 | 4/2013 | Mccall et al. |
| 2014/0129578 A1 | 5/2014 | Lehmann |
| 2015/0254581 A1 | 9/2015 | Brahme |
| 2016/0034845 A1 | 2/2016 | Hiyama et al. |
| 2016/0042484 A1 | 2/2016 | Osann, Jr. |
| 2016/0307287 A1* | 10/2016 | Jat ............... G01C 21/3438 |
| 2016/0364812 A1 | 12/2016 | Cao |
| 2016/0364823 A1 | 12/2016 | Cao |
| 2017/0075358 A1 | 3/2017 | Zhang |
| 2017/0138749 A1* | 5/2017 | Pan ............... G01C 21/3438 |
| 2017/0169366 A1 | 6/2017 | Klein et al. |
| 2017/0228683 A1 | 8/2017 | Hu et al. |
| 2017/0276499 A1 | 9/2017 | Sun et al. |
| 2017/0286884 A1 | 10/2017 | Shoval et al. |
| 2018/0172459 A1* | 6/2018 | Mazzella ......... G01C 21/3626 |
| 2020/0372418 A1* | 11/2020 | Hirose ............ H04W 4/029 |

FOREIGN PATENT DOCUMENTS

| | | |
|---|---|---|
| CN | 103856532 A | 6/2014 |
| CN | 104123836 A | 10/2014 |
| CN | 104217249 A | 12/2014 |
| CN | 104933855 A | 9/2015 |
| CN | 105243836 A | 1/2016 |
| CN | 105761481 A | 7/2016 |
| TW | 201349146 A | 12/2013 |

OTHER PUBLICATIONS

International Search Report in PCT/CN2017/108656 dated Jul. 19, 2018, 4 pages.
Written Opinion in PCT/CN2017/108656 dated Jul. 19, 2018, 4 pages.

* cited by examiner

900

Determining a first estimated time of arrival (ETA) of a candidate service provider to the first pick-up location based on a location of the candidate service provider, the first pick-up location, a second pick-up location of a candidate transportation service associated with the candidate service provider, and a second departure time of the candidate transportation service — 910

Determining a first time difference between the first ETA and the first departure time — 920

Determining whether the first time difference is less than a first threshold difference — 930

Determining whether to determine the candidate service provider as a filtered service provider in response to a result of the determination as to whether the first time difference is less than the first threshold difference — 940

```
┌─────────────────────────────────────────────────────┐
│ Determining a count of one or more requests each of │
│ which having a pick-up location consistent with the │ 1110
│ first pick-up location, the one or more requests    │
│ having been accepted by a candidate service         │
│ provider and having not been completed              │
└─────────────────────────────────────────────────────┘
                          │
                          ▼
┌─────────────────────────────────────────────────────┐
│ Determining whether the count is less than a        │ 1120
│ threshold count                                     │
└─────────────────────────────────────────────────────┘
                          │
                          ▼
┌─────────────────────────────────────────────────────┐
│ Determining whether to determine the candidate      │
│ service provider as a filtered service provider in  │ 1130
│ response to a result of the determination as to     │
│ whether the count is less than the threshold count  │
└─────────────────────────────────────────────────────┘
```

FIG. 11

METHODS AND SYSTEMS FOR CARPOOL SERVICES

CROSS-REFERENCE TO RELATED APPLICATIONS

This application is a continuation of International Application No. PCT/CN2017/108656, filed on Oct. 31, 2017, the contents of which are incorporated herein by reference to its entirety.

TECHNICAL FIELD

The present disclosure generally relates to an on-demand service system, and more particularly, to methods and systems for carpool services.

BACKGROUND

A carpooling transportation service refers to an arrangement that combines two or more transportation services into a new transportation service. The carpooling transportation service may improve the traffic capacity. However, there are some problems such as inefficiency and a bad user experience in existing systems and methods for carpooling. Therefore, it is desirable to provide systems and methods for carpooling to improve the efficiency and the user experience.

SUMMARY

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities, and combinations set forth in the detailed examples discussed below.

According to a first aspect of the present disclosure, a system for carpool services may include a storage device and one or more processors configured to communicate with the storage device. The storage device may include a set of instructions. When the one or more processors executing the set of instructions, the one or more processors may be directed to perform one or more of the following operations. The one or more processors may obtain a pending transportation service requested by a service requester. The pending transportation service may include a first origin and a first destination. The one or more processors may determine a first pick-up location and a first departure time from the first pick-up location for the pending transportation service based on the first origin and the first destination. The one or more processors may determine a target service provider based on the pending transportation service and a shareable transportation service that has been accepted by the target service provider and has not been completed.

In some embodiments, the one or more processors may transmit information relating to the target service provider to the service requester.

In some embodiments, to determine the target service provider based on the pending transportation service and the shareable transportation service, the one or more processors may determine one or more candidate service providers based on the first pick-up location and a location of each of the one or more candidate service providers. The one or more processors may determine one or more filtered service providers by filtering the one or more candidate service providers based on at least one of: the first pick-up location, the first departure time, the first destination, a second pick-up location of a candidate transportation service associated with at least one of the one or more candidate service providers, a second departure time from the second pick-up location of the candidate transportation service, a second destination of the candidate transportation service, or the location of the at least one of the one or more candidate service providers. The one or more processors may determine the target service provider from the one or more filtered service providers.

In some embodiments, a distance between the first pick-up location and the location of each of the one or more candidate service providers may be less than a predetermined distance, or a driving time from the location of each of the one or more candidate service providers to the first pick-up location may be less than a predetermined time period.

In some embodiments, to determine the one or more filtered service providers from the one or more candidate service providers, the one or more processors may determine a first original route based on the first pick-up location and the first destination. The one or more processors may determine a first sharing route based on the first pick-up location, the first destination, the second destination of the candidate transportation service associated with the at least one of the one or more candidate service providers, and at least one of the second pick-up location and the location of the at least one of the one or more candidate service providers. The one or more processors may compare the first original route with the first sharing route. The one or more processors may determine a second original route based on the location of the at least one of the one or more candidate service providers and the second destination. The one or more processors may determine a second sharing route based on the first pick-up location, the first destination, the second destination, and at least one of the second pick-up location and the location of the at least one of the one or more candidate service providers. The one or more processors may compare the second original route with the second sharing route. The one or more processors may determine whether to determine the at least one of the one or more candidate service providers as the filtered service provider based on a result of the comparison between the first original route and the first sharing route, and a result of the comparison between the second original route and the second sharing route.

In some embodiments, to determine the one or more filtered service providers from the one or more candidate service providers, the one or more processors may determine a first direction from the location of the at least one of the one or more candidate service providers to the first pick-up location. The one or more processors may determine a second direction from the location of the at least one of the one or more candidate service providers to the second destination. The one or more processors may determine an angle between the first direction and the second direction. The one or more processors may determine whether the angle is less than a threshold angle. The one or more processors may determine whether to select the at least one of the one or more candidate service providers as the filtered service provider in response to a result of the determination as to whether the angle is less than the threshold angle.

In some embodiments, to determine the one or more filtered service providers from the one or more candidate service providers, the one or more processors may determine an estimated time of arrival (ETA) of the at least one of the one or more candidate service providers to the first pick-up location based on the location of the at least one of the one or more candidate service providers, the first pick-up location, the second pick-up location, and the second departure time. The one or more processors may determine a time difference between the ETA of the at least one of the one or more candidate service providers to the first pick-up location and the first departure time. The one or more processors may determine whether the time difference is less than a threshold difference. The one or more processors may determine whether to select the at least one of the one or more candidate service providers as the filtered service provider in response to a result of the determination as to whether the time difference is less than the threshold difference.

In some embodiments, to determine the one or more filtered service providers from the one or more candidate service providers, the one or more processors may determine an estimated time of arrival (ETA) of the at least one of the one or more candidate service providers to the second pick-up location based on the location of the at least one of the one or more candidate service providers, the first pick-up location, the first departure time, and the second pick-up location. The one or more processors may determine a time difference between the ETA of the at least one of the one or more candidate service providers to the second pick-up location and the second departure time. The one or more processors may determine whether the time difference is less than a threshold difference. The one or more processors may determine whether to select the at least one of the one or more candidate service providers as the filtered service provider in response to a result of the determination as to whether the time difference is less than the threshold difference.

In some embodiments, to determine the one or more filtered service providers from the one or more candidate service providers, the one or more processors may determine a count of one or more requests each of which having a pick-up location consistent with the first pick-up location, the one or more requests having been accepted by the at least one of the one or more candidate service providers and having not been completed. The one or more processors may determine whether the count is less than a threshold count. The one or more processors may determine whether to select the at least one of the one or more candidate service providers as the filtered service provider in response to a result of the determination as to whether the count is less than the threshold count.

In some embodiments, the one or more processors may transmit the pending transportation service to the target service provider.

According to another aspect of the present disclosure, a method for carpool services may include one or more of the following operations. One or more processors may obtain a pending transportation service requested by a service requester. The pending transportation service may include a first origin and a first destination. The one or more processors may determine a first pick-up location and a first departure time from the first pick-up location for the pending transportation service based on the first origin and the first destination. The one or more processors may determine a target service provider based on the pending transportation service and a shareable transportation service that has been accepted by the target service provider and has not been completed.

According to yet another aspect of the present disclosure, a non-transitory computer readable medium may comprise at least one set of instructions. The at least one set of instructions may be executed by one or more processors of a computer server. The one or more processors may obtain a pending transportation service requested by a service requester. The pending transportation service may include a first origin and a first destination. The one or more processors may determine a first pick-up location and a first departure time from the first pick-up location for the pending transportation service based on the first origin and the first destination. The one or more processors may determine a target service provider based on the pending transportation service and a shareable transportation service that has been accepted by the target service provider and has not been completed.

According to yet another aspect of the present disclosure, a system for carpool services may comprise an I/O module configured to obtain a pending transportation service requested by a service requester. The pending transportation service may include a first origin and a first destination. The system for carpool services may also comprise a service information determination module configured to determine a first pick-up location and a first departure time from the first pick-up location for the pending transportation service based on the first origin and the first destination. The system for carpool services may also comprise a provider determination module configured to determine a target service provider based on the pending transportation service and a shareable transportation service that has been accepted by the target service provider and has not been completed.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIG. 9 is a flowchart illustrating an exemplary process of selecting a candidate service provider according to some embodiments of the present disclosure;

FIG. 11 is a flowchart illustrating an exemplary process of selecting a candidate service provider according to some embodiments of the present disclosure.

DETAILED DESCRIPTION

Figure 1:
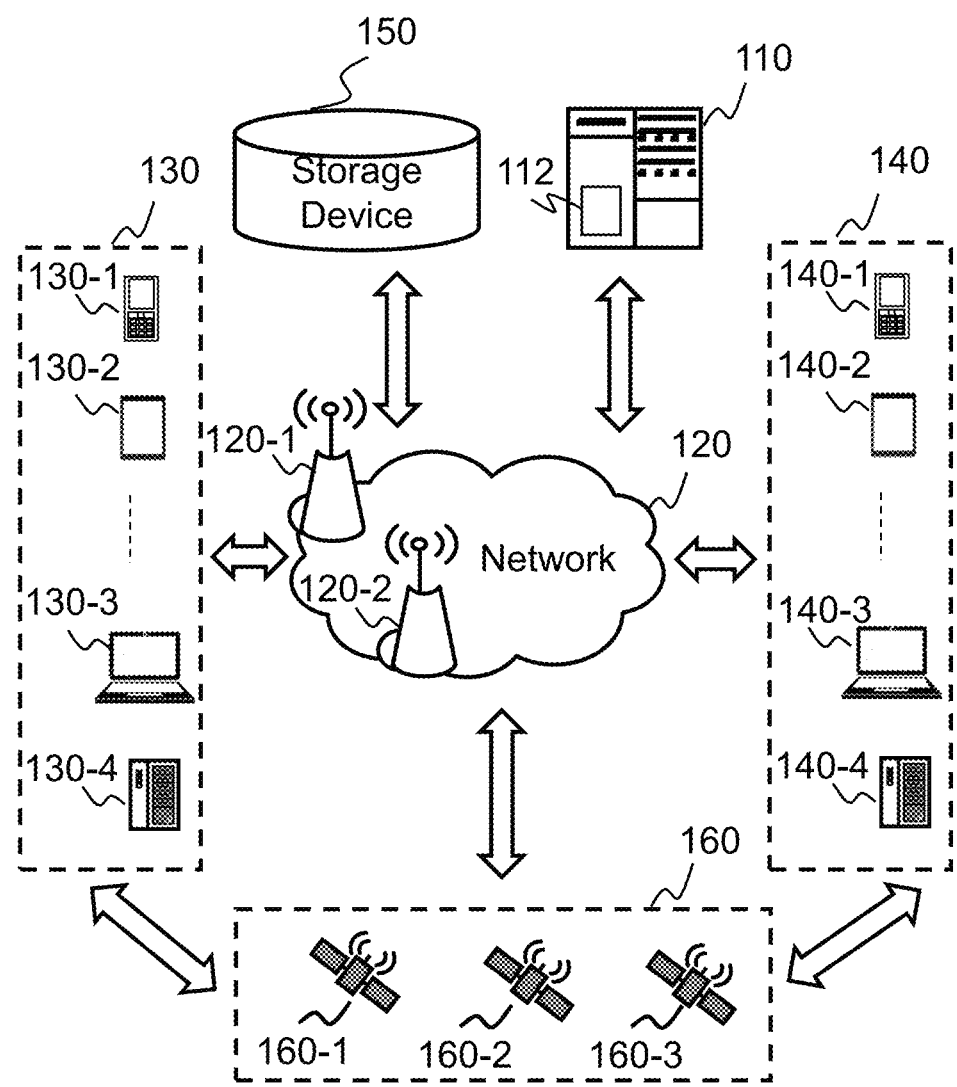
FIG. 1 is a block diagram of an exemplary on-demand service system according to some embodiments.

The following description is presented to enable any person skilled in the art to make and use the present disclosure and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown but is to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprises," "comprising," "includes," and/or "including" when used in this disclosure, specify the presence of stated features, integers, steps, operations, elements, and/or components, but do not preclude the presence or addition of one or more other features, integers, steps, operations, elements, components, and/or groups thereof.

These and other features, and characteristics of the present disclosure, as well as the methods of operations and functions of the related elements of structure and the combination of parts and economies of manufacture, may become more apparent upon consideration of the following description with reference to the accompanying drawing(s), all of which form part of this specification. It is to be expressly understood, however, that the drawing(s) are for the purpose of illustration and description only and are not intended to limit the scope of the present disclosure. It is understood that the drawings are not to scale.

The flowcharts used in the present disclosure illustrate operations that systems implement according to some embodiments of the present disclosure. It is to be expressly understood, the operations of the flowcharts may be implemented not in order. Conversely, the operations may be implemented in inverted order, or simultaneously. Moreover, one or more other operations may be added to the flowcharts. One or more operations may be removed from the flowcharts.

Moreover, while the systems and methods disclosed in the present disclosure are described primarily regarding on-demand transportation service, it should also be understood that this is only one exemplary embodiment. The system or method of the present disclosure may be applied to any other kind of on-demand service. For example, the system or method of the present disclosure may be applied to different transportation systems including land, ocean, aerospace, or the like, or any combination thereof. The vehicle of the transportation systems may include a taxi, a private car, a hitch, a bus, a train, a bullet train, a high speed rail, a subway, a vessel, an aircraft, a spaceship, a hot-air balloon, a driverless vehicle, a bicycle, a tricycle, a motorcycle, or the like, or any combination thereof. The transportation system may also include any transportation system that applies management and/or distribution, for example, a system for transmitting and/or receiving an express, or a system for a take-out service. The application scenarios of the system or method of the present disclosure may include a web page, a plug-in of a browser, a client terminal, a custom system, an internal analysis system, an artificial intelligence robot, or the like, or any combination thereof.

The terms "passenger," "requester," "service requester," and "customer" in the present disclosure are used interchangeably to refer to an individual, an entity or a tool that may request or order a service. Also, the terms "driver," "provider," "service provider," and "supplier" in the present disclosure are used interchangeably to refer to an individual, an entity, or a tool that may provide a service or facilitate the providing of the service. The term "user" in the present disclosure may refer to an individual, an entity, or a tool that may request a service, order a service, provide a service, or facilitate the providing of the service. For example, the user may be a passenger, a driver, an operator, or the like, or any combination thereof. In the present disclosure, terms "passenger" and "passenger terminal" may be used interchangeably, and terms "driver" and "driver terminal" may be used interchangeably.

The term "service request" in the present disclosure refers to a request that initiated by a passenger, a requester, a service requester, a customer, a driver, a provider, a service provider, a supplier, or the like, or any combination thereof. The service request may be accepted by any one of a passenger, a requester, a service requester, a customer, a driver, a provider, a service provider, or a supplier. The service request may be chargeable, or free.

The positioning technology used in the present disclosure may include a global positioning system (GPS), a global navigation satellite system (GLONASS), a compass navigation system (COMPASS), a Galileo positioning system, a quasi-zenith satellite system (QZSS), a wireless fidelity (WiFi) positioning technology, or the like, or any combination thereof. One or more of the above positioning technologies may be used interchangeably in the present disclosure.

An aspect of the present disclosure relates to systems and methods for carpool relating to an online on-demand service (e.g., a taxi service). After receiving a transportation service, including an origin and a destination, requested by a passenger, an online on-demand service platform may determine a pick-up location and a departure time from the pick-up location for the passenger. The online on-demand service platform may identify, based on the pick-up location, the destination, and the departure time, a driver for the passenger to combine the transportation service with another transportation service that is being provided by the driver.

It should be noted that online on-demand transportation service, such as online carpool service, is a new form of service rooted only in post-Internet era. It provides technical solutions to users and service providers that could raise only in post-Internet era. In the pre-Internet era, when a user hails a taxi on the street, the taxi request and acceptance occur only between the passenger and one taxi driver that sees the passenger. If the passenger hails a taxi through a telephone call, the service request and acceptance may occur only between the passenger and one service provider (e.g., one taxi company or agent). If a driver wants to provide a carpool service, the driver has to ask a passenger face to face and determine whether the carpooling service is possible to be provided to the passenger by the experience of the driver. Online carpool service, however, obtains transaction requests and finds combinable transaction requests in real-time and automatically. The carpool service also allows a user of the service to real-time and automatic distribute a service request to a vast number of individual service providers (e.g., taxi) distance away from the user and allows a plurality of service provides to respond to the service request simultaneously and in real-time. Therefore, through Internet, the online on-demand transportation systems may provide a much more efficient transaction platform for the users and the service providers that may never meet in a traditional pre-Internet transportation service system.

FIG. 1 is a schematic diagram illustrating an exemplary on-demand service system according to some embodiments of the present disclosure. For example, the on-demand service system 100 may be an online on-demand transportation service system for transportation services such as taxi hailing, chauffeur services, delivery service, carpool, bus service, take-out service, driver hiring and shuttle services. For brevity, the methods and/or systems described in the present disclosure may take a taxi service as an example. It should be noted that the taxi service is merely provided for the purposes of illustration, and not intended to limit the scope of the present disclosure. For persons having ordinary skills in the art, the methods and/or systems described in the present disclosure may be applied to other similar situations, such as a delivery service, etc.

The on-demand service system 100 may include a server 110, a network 120, a requester terminal 130, a provider terminal 140, a storage device 150, and a positioning system 160. The server 110 may include a processing engine 112.

In some embodiments, the server 110 may be a single server or a server group. The server group may be centralized, or distributed (e.g., the server 110 may be a distributed system). In some embodiments, the server 110 may be local or remote. For example, the server 110 may access information and/or data stored in the requester terminal 130, the provider terminal 140, and/or the storage device 150 via the network 120. As another example, the server 110 may be directly connected to the requester terminal 130, the provider terminal 140, and/or the storage device 150 to access stored information and/or data. In some embodiments, the server 110 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof. In some embodiments, the server 110 may be implemented on a computing device 200 having one or more components illustrated in FIG. 2 in the present disclosure.

In some embodiments, the server 110 may include a processing engine 112. The processing engine 112 may process information and/or data relating to the on-demand service. For example, the processing engine 112 may determine a target service provider for a service requester. In some embodiments, the processing engine 112 may include one or more processing engines (e.g., single-core processing engine(s) or multi-core processor(s)). Merely by way of example, the processing engine 112 may include one or more hardware processors, such as a central processing unit (CPU), an application-specific integrated circuit (ASIC), an application-specific instruction-set processor (ASIP), a graphics processing unit (GPU), a physics processing unit (PPU), a digital signal processor (DSP), a field-programmable gate array (FPGA), a programmable logic device (PLD), a controller, a microcontroller unit, a reduced instruction-set computer (RISC), a microprocessor, or the like, or any combination thereof.

The network 120 may facilitate the exchange of information and/or data. In some embodiments, one or more components in the on-demand service system 100 (e.g., the server 110, the requester terminal 130, the provider terminal 140, the storage device 150, and the positioning system 160) may send information and/or data to other component(s) in the on-demand service system 100 via the network 120. For example, the server 110 may obtain/acquire a service request from the requester terminal 130 via the network 120. In some embodiments, the network 120 may be any type of wired or wireless network, or a combination thereof. Merely by way of example, the network 120 may include a cable network, a wireline network, an optical fiber network, a telecommunications network, an intranet, the Internet, a local area network (LAN), a wide area network (WAN), a wireless local area network (WLAN), a metropolitan area network (MAN), a wide area network (WAN), a public telephone switched network (PSTN), a Bluetooth™ network, a ZigBee network, a near field communication (NFC) network, or the like, or any combination thereof. In some embodiments, the network 120 may include one or more network access points. For example, the network 120 may include wired or wireless network access points such as base stations and/or internet exchange points 120-1, 120-2, . . . , through which one or more components of the on-demand service system 100 may be connected to the network 120 to exchange data and/or information.

In some embodiments, a requester may be a user of the requester terminal 130. In some embodiments, the user of the requester terminal 130 may be someone other than the requester. For example, a user A of the requester terminal 130 may use the requester terminal 130 to send a service request for a user B, or receive service and/or information or instructions from the server 110. In some embodiments, a provider may be a user of the provider terminal 140. In some embodiments, the user of the provider terminal 140 may be someone other than the provider. For example, a user C of the provider terminal 140 may use the provider terminal 140 to receive a service request for a user D, and/or information or instructions from the server 110. In some embodiments, "requester" and "requester terminal" may be used interchangeably, and "provider" and "provider terminal" may be used interchangeably.

In some embodiments, the requester terminal 130 may include a mobile device 130-1, a tablet computer 130-2, a laptop computer 130-3, a built-in device in a motor vehicle 130-4, or the like, or any combination thereof. In some embodiments, the mobile device 130-1 may include a smart home device, a wearable device, a mobile device, a virtual reality device, an augmented reality device, or the like, or any combination thereof. In some embodiments, the smart home device may include a smart lighting device, a control device of an intelligent electrical apparatus, a smart monitoring device, a smart television, a smart video camera, an interphone, or the like, or any combination thereof. In some embodiments, the wearable device may include a bracelet, footgear, glasses, a helmet, a watch, clothing, a backpack, a smart accessory, or the like, or any combination thereof. In some embodiments, the mobile device may include a mobile phone, a personal digital assistant (PDA), a gaming device, a navigation device, a point of sale (POS) device, a laptop, a desktop, or the like, or any combination thereof. In some embodiments, the virtual reality device and/or the augmented reality device may include a virtual reality helmet, a virtual reality glass, a virtual reality patch, an augmented reality helmet, augmented reality glasses, an augmented reality patch, or the like, or any combination thereof. For example, the virtual reality device and/or the augmented reality device may include a Google Glass™, a RiftCon™, a Fragments™, a Gear VR™, etc. In some embodiments, a built-in device in the motor vehicle 130-4 may include an onboard computer, an onboard television, etc. In some embodiments, the requester terminal 130 may be a device with positioning technology for locating the position of a user of the requester terminal 130 (e.g., a service requester) and/or the requester terminal 130.

In some embodiments, the provider terminal 140 may be a device that is similar to or the same as the requester terminal 130. In some embodiments, the provider terminal 140 may be a device utilizing positioning technology for locating the position of a user of the provider terminal 140 (e.g., a service provider) and/or the provider terminal 140. In some embodiments, the requester terminal 130 and/or the provider terminal 140 may communicate with one or more other positioning devices to determine the position of the requester, the requester terminal 130, the provider, and/or the provider terminal 140. In some embodiments, the requester terminal 130 and/or the provider terminal 140 may send positioning information to the server 110.

The storage device 150 may store data and/or instructions. In some embodiments, the storage device 150 may store data obtained from the requester terminal 130 and/or the provider terminal 140. For example, the storage device 150 may store real-time locations of a service provider obtained from the provider terminal 140. In some embodiments, the storage device 150 may store data and/or instructions that the server 110 may execute or use to perform exemplary methods described in the present disclosure. For example, the storage device 150 may store instructions that the server 110 may execute or use to determine a target service provider for a service requester. In some embodiments, the storage device 150 may include a mass storage, removable storage, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (EPROM), an electrically-erasable programmable ROM (EEPROM), a compact disk ROM (CD-ROM), and a digital versatile disk ROM, etc. In some embodiments, the storage device 150 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the storage device 150 may be connected to the network 120 to communicate with one or more components of the on-demand service system 100 (e.g., the server 110, the requester terminal 130, the provider terminal 140). One or more components of the on-demand service system 100 may access the data or instructions stored in the storage device 150 via the network 120. In some embodiments, the storage device 150 may be directly connected to or communicate with one or more components of the on-demand service system 100 (e.g., the server 110, the requester terminal 130, the provider terminal 140). In some embodiments, one or more components of the on-demand service system 100 (e.g., the server 110, the requester terminal 130, the provider terminal 140) may have permission to access the storage device 150. In some embodiments, the storage device 150 may be part of the server 110.

The positioning system 160 may determine information associated with an object, for example, the requester terminal 130, the provider terminal 140, etc. For example, the positioning system 160 may determine a current location of the requester terminal 130. In some embodiments, the positioning system 160 may be a global positioning system (GPS), a global navigation satellite system (GLONASS), a compass navigation system (COMPASS), a BeiDou navigation satellite system (BDS), a Galileo positioning system, a quasi-zenith satellite system (QZSS), etc. The information may include a location, an elevation, a velocity, or an acceleration of the object, or a current time. The location may be in the form of coordinates, such as, latitude coordinate and longitude coordinate, etc. The positioning system 160 may include one or more satellites, for example, a satellite 160-1, a satellite 160-2, and a satellite 160-3. The satellites 160-1 through 160-3 may determine the information mentioned above independently or jointly. The positioning system 160 may send the information mentioned above to the network 120, the requester terminal 130, or the provider terminal 140 via wireless connections.

In some embodiments, information exchanging of one or more components of the on-demand service system 100 may be achieved by way of requesting a service. The object of the service request may be any product. In some embodiments, the product may be a tangible product or an immaterial product. The tangible product may include food, medicine, commodity, chemical product, electrical appliance, clothing, car, housing, luxury, or the like, or any combination thereof. The immaterial product may include a servicing product, a financial product, a knowledge product, an internet product, or the like, or any combination thereof. The internet product may include an individual host product, a web product, a mobile internet product, a commercial host product, an embedded product, or the like, or any combination thereof. The mobile internet product may be used in a software of a mobile terminal, a program, a system, or the like, or any combination thereof. The mobile terminal may include a tablet computer, a laptop computer, a mobile phone, a personal digital assistant (PDA), a smartwatch, a point of sale (POS) device, an onboard computer, an onboard television, a wearable device, or the like, or any combination thereof. For example, the product may be any software and/or application used on the computer or mobile phone. The software and/or application may relate to socializing, shopping, transporting, entertainment, learning, investment, or the like, or any combination thereof. In some embodiments, the software and/or application relating to transporting may include a traveling software and/or application, a vehicle scheduling software and/or application, a mapping software and/or application, etc. In the vehicle scheduling software and/or application, the vehicle may include a horse, a carriage, a rickshaw (e.g., a wheelbarrow, a bike, a tricycle, etc.), a car (e.g., a taxi, a bus, a private car, etc.), a train, a subway, a vessel, an aircraft (e.g., an airplane, a helicopter, a space shuttle, a rocket, a hot-air balloon, etc.), or the like, or any combination thereof.

Figure 2:
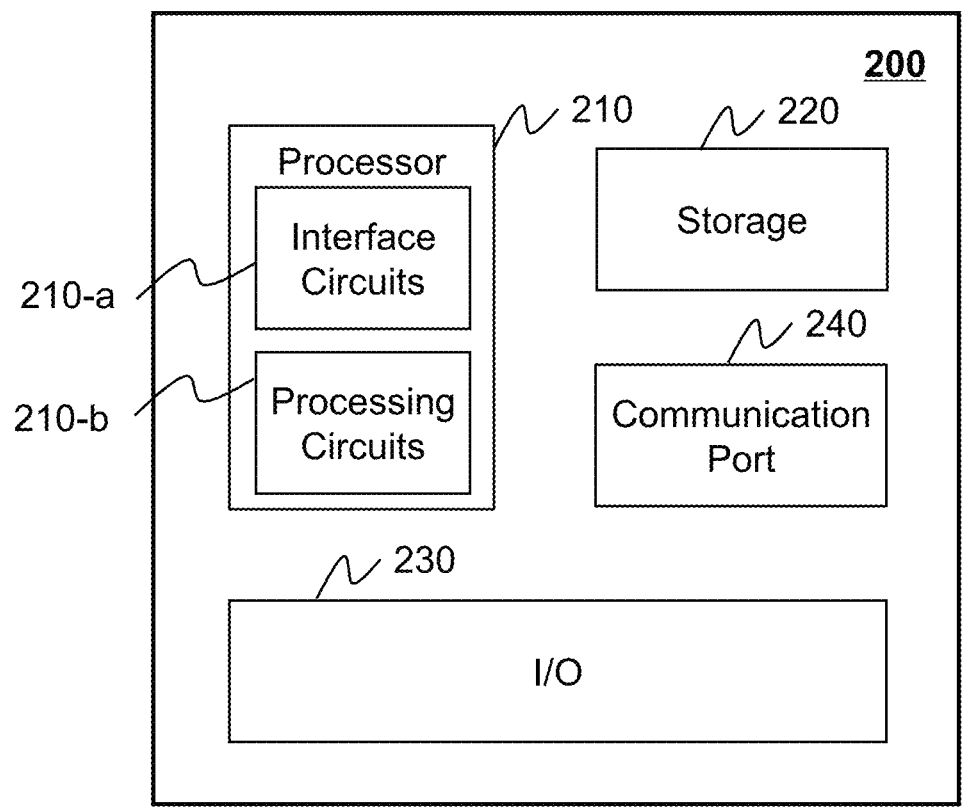
FIG. 2 is a schematic diagram illustrating exemplary hardware and software components of a computing device according to some embodiments of the present disclosure.

FIG. 2 is a schematic diagram illustrating exemplary hardware and/or software components of a computing device on which the processing engine 112 may be implemented according to some embodiments of the present disclosure. As illustrated in FIG. 2, the computing device 200 may include a processor 210, a storage 220, an input/output (I/O) 230, and a communication port 240.

The processor 210 (e.g., logic circuits) may execute computer instructions (e.g., program code) and perform functions of the processing engine 112 in accordance with techniques described herein. For example, the processor 210 may include interface circuits 210-a and processing circuits 210-b therein. The interface circuits may be configured to receive electronic signals from a bus (not shown in FIG. 2), wherein the electronic signals encode structured data and/or instructions for the processing circuits to process. The processing circuits may conduct logic calculations, and then determine a conclusion, a result, and/or an instruction encoded as electronic signals. Then the interface circuits may send out the electronic signals from the processing circuits via the bus.

The computer instructions may include, for example, routines, programs, objects, components, data structures, procedures, modules, and functions, which perform particular functions described herein. For example, the processor 210 may determine a target service provider for a service requester. In some embodiments, the processor 210 may include one or more hardware processors, such as a microcontroller, a microprocessor, a reduced instruction set computer (RISC), an application specific integrated circuits (ASICs), an application-specific instruction-set processor (ASIP), a central processing unit (CPU), a graphics processing unit (GPU), a physics processing unit (PPU), a microcontroller unit, a digital signal processor (DSP), a field programmable gate array (FPGA), an advanced RISC machine (ARM), a programmable logic device (PLD), any circuit or processor capable of executing one or more functions, or the like, or any combinations thereof.

Merely for illustration, only one processor is described in the computing device 200. However, it should be noted that the computing device 200 in the present disclosure may also include multiple processors, thus operations and/or method steps that are performed by one processor as described in the present disclosure may also be jointly or separately performed by the multiple processors. For example, if in the present disclosure the processor of the computing device 200 executes both step A and step B, it should be understood that step A and step B may also be performed by two or more different processors jointly or separately in the computing device 200 (e.g., a first processor executes step A and a second processor executes step B, or the first and second processors jointly execute steps A and B).

The storage 220 may store data/information obtained from the requester terminal 130, the provider terminal 140, the storage device 150, and/or any other component of the on-demand service system 100. In some embodiments, the storage 220 may include a mass storage, removable storage, a volatile read-and-write memory, a read-only memory (ROM), or the like, or any combination thereof. For example, the mass storage may include a magnetic disk, an optical disk, a solid-state drive, etc. The removable storage may include a flash drive, a floppy disk, an optical disk, a memory card, a zip disk, a magnetic tape, etc. The volatile read-and-write memory may include a random access memory (RAM). The RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. The ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the storage 220 may store one or more programs and/or instructions to perform exemplary methods described in the present disclosure. For example, the storage 220 may store a program for the processing engine 112 for determining a target service provider for a service requester.

The I/O 230 may input and/or output signals, data, information, etc. In some embodiments, the I/O 230 may enable a user interaction with the processing engine 112. For example, an operator of the server 110 may input an instruction relating to determining a target service provider for a service requester through the I/O 230. In some embodiments, the I/O 230 may include an input device and an output device. Examples of the input device may include a keyboard, a mouse, a touch screen, a microphone, or the like, or a combination thereof. Examples of the output device may include a display device, a loudspeaker, a printer, a projector, or the like, or a combination thereof. Examples of the display device may include a liquid crystal display (LCD), a light-emitting diode (LED)-based display, a flat panel display, a curved screen, a television device, a cathode ray tube (CRT), a touch screen, or the like, or a combination thereof.

The communication port 240 may be connected to a network (e.g., the network 120) to facilitate data communications. The communication port 240 may establish connections between the processing engine 112 and the requester terminal 130, the provider terminal 140, the positioning system 160, or the storage device 150. The connection may be a wired connection, a wireless connection, any other communication connection that can enable data transmission and/or reception, and/or any combination of these connections. The wired connection may include, for example, an electrical cable, an optical cable, a telephone wire, or the like, or any combination thereof. The wireless connection may include, for example, a Bluetooth™ link, a Wi-Fi™ link, a WiMax™ link, a WLAN link, a ZigBee link, a mobile network link (e.g., 3G, 4G, 5G, etc.), or the like, or a combination thereof. In some embodiments, the communication port 240 may be and/or include a standardized communication port, such as RS232, RS485, etc.

Figure 3:
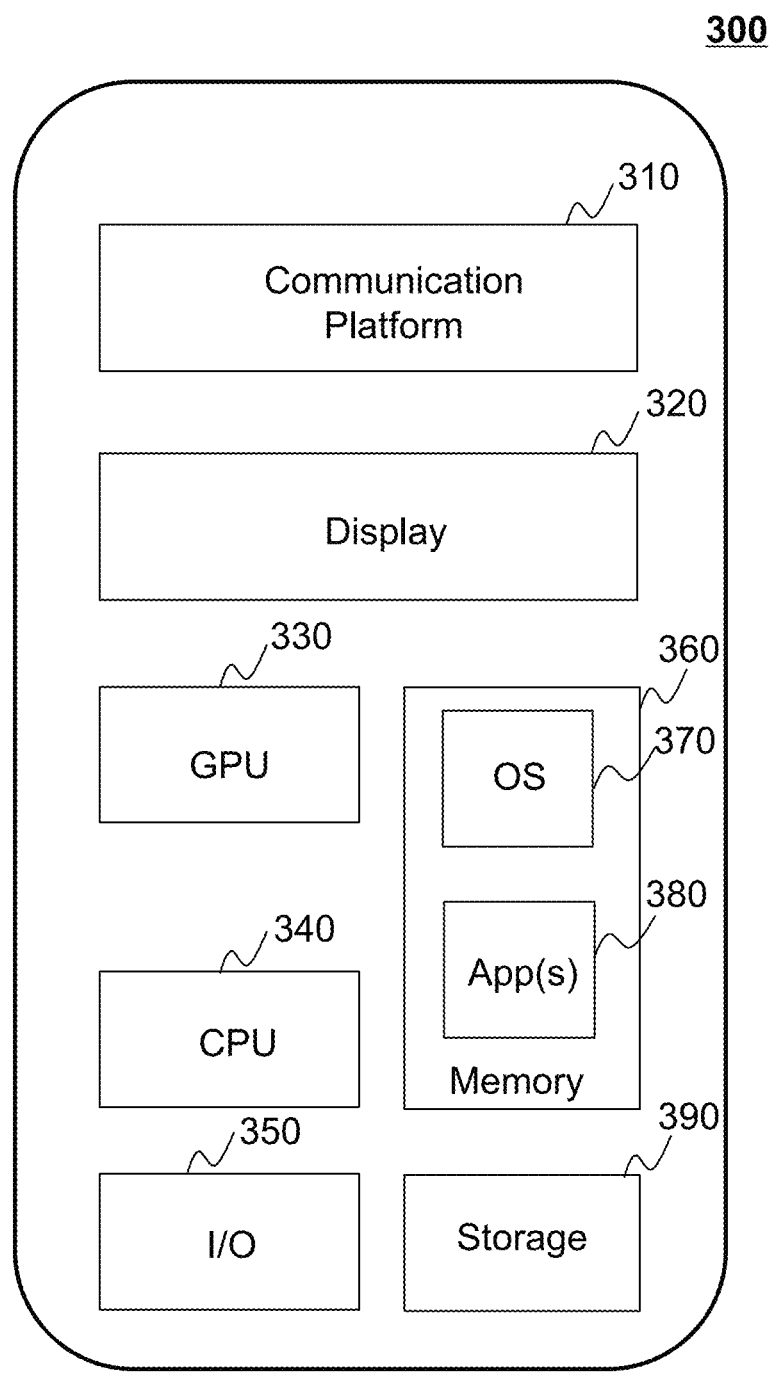
FIG. 3 is a schematic diagram illustrating exemplary hardware and/or software components of a mobile device according to some embodiments of the present disclosure.

FIG. 3 a schematic diagram illustrating exemplary hardware and/or software components of a mobile device on which the requester terminal 130 and/or the provider terminal 140 may be implemented according to some embodiments of the present disclosure. As illustrated in FIG. 3, the mobile device 300 may include a communication platform 310, a display 320, a graphics processing unit (GPU) 330, a central processing unit (CPU) 340, an I/O 350, a memory 360, and a storage 390. In some embodiments, any other suitable component, including but not limited to a system bus or a controller (not shown), may also be included in the mobile device 300. In some embodiments, a mobile operating system (OS) 370 (e.g., iOS™, Android™, Windows Phone™, etc.) and one or more applications 380 may be loaded into the memory 360 from the storage 390 in order to be executed by the CPU 340. The applications 380 may include a browser or any other suitable mobile apps for receiving and rendering information relating to an online carpooling transportation service or other information from the processing engine 112, and sending information relating to an online carpooling transportation service or other information to the processing engine 112. User interactions with the information stream may be achieved via the I/O 350 and provided to the processing engine 112 and/or other components of the on-demand service system 100 via the network 120. For example, a service requester may input an origin and a destination through the I/O 350 of the requester terminal 130. The origin and the destination may be transmitted to the processing engine 112.

One of ordinary skill in the art would understand that when an element of the on-demand service system 100 performs, the element may perform through electrical signals and/or electromagnetic signals. For example, when the processing engine 112 processes a task, such as making a determination, or identifying information, the processing engine 112 may operate logic circuits in its processor to process such task. When the processing engine 112 sends out data (e.g., a target service provider, a service request) to the requester terminal 130 and/or the provider terminal 140, a processor of the processing engine 112 may generate electrical signals encoding/including the data. The processor of the processing engine 112 may then send the electrical signals to an output port of the processing engine 112. If the requester terminal 130 and/or the provider terminal 140 communicate with the processing engine 112 via a wired network, the output port of the processing engine 112 may be physically connected to a cable, which may further transmit the electrical signals to an input port of the requester terminal 130 and/or the provider terminal 140. If the requester terminal 130 and/or the provider terminal 140 communicate with the processing engine 112 via a wireless network, the output port of the processing engine 112 may be one or more antennas, which may convert the electrical signals to electromagnetic signals. Within an electronic device, such as the requester terminal 130, the provider terminal 140, or the server 110, when a processor thereof processes an instruction, sends out an instruction, and/or performs an action, the instruction and/or action is conducted via electrical signals. For example, when the processor retrieves or saves data from a storage medium (e.g., the storage device 150, the storage 220), it may send out electrical signals to a read/write device of the storage medium, which may read or write structured data in the storage medium. The structured data may be transmitted to the processor in the form of electrical signals via a bus of the electronic device. Here, an electrical signal may refer to one electrical signal, a series of electrical signals, and/or a plurality of discrete electrical signals.

Figure 4:
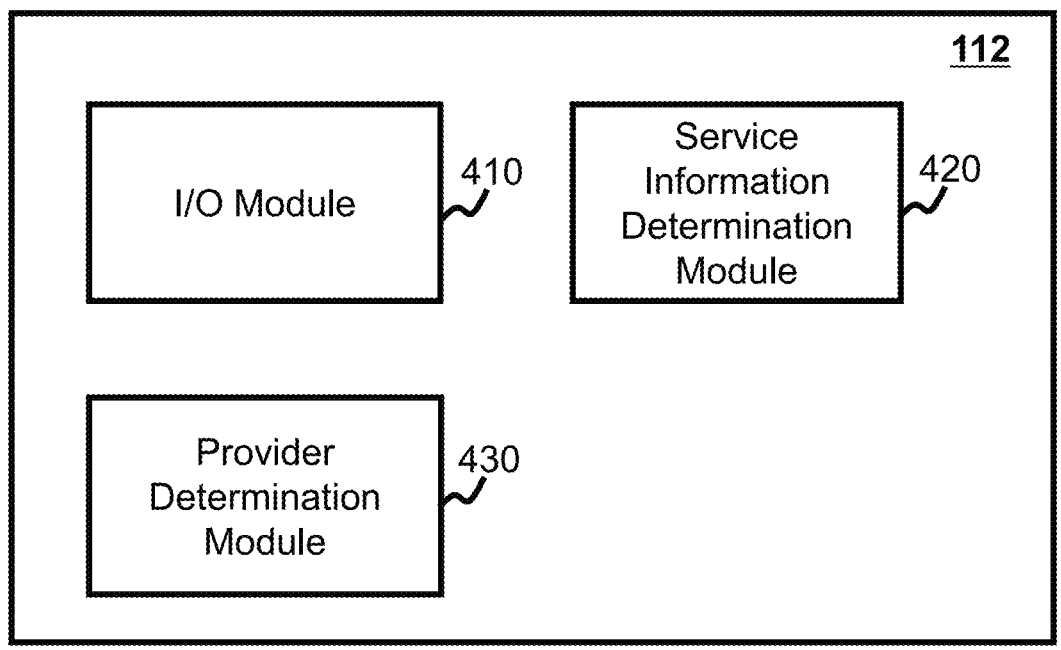
FIG. 4 is a block diagram illustrating an exemplary processing engine according to some embodiments of the present disclosure.

FIG. 4 is a block diagram illustrating an exemplary processing engine according to some embodiments of the present disclosure. The processing engine 112 may include an I/O module 410, a service information determination module 420, and a provider determination module 430.

The I/O module 410 may obtain a pending transportation service requested by a service requester. In some embodiments, the pending transportation service refers to a transportation service that has not been accepted by a service provider.

In some embodiments, a transportation service may be a service of taking a subject from one location to another location using a vehicle. The subject may include passengers and/or goods. For example, the transportation service may be a taxi service or a delivery service. The vehicle relating to the transportation service may include a taxi, a private car, a hitch, a bus, a bike, an electric bicycle, a tricycle, a motorcycle, a train, a bullet train, a high-speed rail, a subway, a vessel, an aircraft, a spaceship, a hot-air balloon, a driverless vehicle, or the like, or any combination thereof.

In some embodiments, the I/O module 410 may receive the pending transportation service from a terminal associated with the service requester (e.g., the requester terminal 130). In some embodiments, the requester terminal 130 (and/or the provider terminal 140) may establish a communication (e.g., wireless communication) with the server 110, through an application (e.g., the application 380 in FIG. 3) installed in the requester terminal 130 (and/or the provider terminal 140) via the network 120. The application may associate with the on-demand service system 100. For example, the application may be a taxi-hailing application associated with the on-demand service system 100.

The pending transportation service may include a first origin and a first destination. In some embodiments, the first origin and/or the first destination may be a specified location input by the service requester through the requester terminal 130 (e.g., the I/O 350 in FIG. 3). In some embodiments, the requester terminal 130 may automatically obtain the first origin and/or the first destination. For example, an event such as "A meeting at location A at 10:00 a.m. on Oct. 13, 2017" is recorded in a calendar in the requester terminal 130. The requester terminal 130 may automatically determine location A as the first destination based on the event in the calendar. In some embodiments, the requester terminal 130 may obtain its location (which is referred to as the location of the service requester) herein through a positioning technology in the requester terminal 130, for example, the GPS, GLONASS, COMPASS, QZSS, BDS, WiFi positioning technology, or the like, or any combination thereof. The application installed in the requester terminal 130 may direct the requester terminal 130 to transmit, continuously or periodically, the real-time location of the service requester to the server 110. Consequently, the server 110 may acquire the location of the service requester in real-time or substantially real-time. The first origin may be a real-time location, corresponding to the time point when the I/O module 410 obtains the pending transportation service, of the service requester obtained by the requester terminal 130 through a positioning technology (e.g., GPS).

In some embodiments, the pending transportation service may correspond to a service request (also referred to as a transaction request or a request). In some embodiments, the service request may be formally sent out by the service requester through the requester terminal 130. For example, when the service requester initiates the pending transportation service by sending out the first origin and the first destination to the I/O module 410, the service requester may do so by pressing a button on an interface of the application installed in the requester terminal 130. Upon receiving the first origin and the first destination, the I/O module 410 may determine that the pending transportation service has been sent out and determine the pending transportation service as a request.

In some embodiments, the pending transportation service may correspond to an intention of the service requester. The application installed in the requester terminal 130 may direct the requester terminal 130 to monitor, continuously or periodically, input from the service requester and send the input to the on-demand service system 100. Consequently, the requester terminal 130 may inform the service requester's input to the on-demand service system 100 in real-time or substantially real-time. As a result, when the service requester input the first origin and/or the first destination, the on-demand service system 100 may receive enough information to determine an intention of the service requester. For example, when the service requester inputs the first origin and the first destination, and before sending out the first origin and the first destination to the on-demand service system 100, the on-demand service system 100 may have already received the first origin and the first destination, and determine that the service requester intends to request a transportation service.

In some embodiments, the pending transportation service may be a real-time transportation service or a transportation service appointment. As used herein, a real-time transportation service may be a service that the requester wishes to conduct the requested transaction (e.g., transportation service) at the present moment or at a defined time reasonably close to the present moment for an ordinary person in the art, so that a service provider is required to depart immediately or substantially immediately after the on-demand service system 100 receives the service request. For example, an intention may be for real-time transportation service if the defined time is shorter than a threshold value, such as 1 minute, 5 minutes, or 10 minutes. The transportation service that needs to make an appointment refers to a service that the requester wishes to conduct the requested transaction at a defined time which is reasonably far from the present moment for the ordinary person in the art, so that a service provider is not required to depart immediately or substantially immediately after the on-demand service system 100 receives the service request. For example, a transportation service may need an appointment if the defined time is longer than a threshold value, such as 20 minutes, 2 hours, or 1 day.

The service information determination module 420 may determine a first pick-up location and a first departure time from the first pick-up location for the pending transportation service based on the first origin and the first destination.

In some embodiments, the processing engine 112 may determine a plurality of candidate pick-up locations in advance and store the plurality of candidate pick-up locations in the storage device 150 and/or the storage 220. The service information determination module 420 may select one of the plurality of candidate pick-up locations as the first pick-up location. For example, the service information determination module 420 may select a candidate pick-up location that has the shortest travel distance from the first origin to the candidate pick-up location among the plurality of candidate pick-up locations. As used herein, a travel distance refers to a length of a route from one location to another location.

In some embodiments, the service information determination module 420 may select two or more candidate pick-up locations from the plurality of candidate pick-up locations. The I/O module 410 may transmit the selected candidate pick-up locations to the requester terminal 130. The service requester may select one of the selected candidate pick-up locations. The service information determination module 420 may determine the candidate pick-up location selected by the service requester as the first pick-up location.

In some embodiments, the service information determination module 420 may determine an estimated time of arrival from the first origin to the first pick-up location based on a route (e.g., a length of the route, a road condition of the route) from the first origin to the first pick-up location. The service information determination module 420 may determine the first departure time based on the estimated time of arrival from the first origin to the first pick-up location. For example, the current time (e.g., the time point when the I/O module 410 obtains the first transportation service) is 9:57 a.m. The service information determination module 420 may determine that the travel distance from the first origin to the first pick-up location is 250 meters and estimate the walking time for the service requester from the first origin to the first pick-up location is 3 minutes. The service information determination module 420 may determine that the estimated time of arrival from the first origin to the first pick-up location is 10:00 a.m. The service information determination module 420 may add a time period (also referred to as a buffer time), such as 5 minutes, to the estimated time of arrival from the first origin to the first pick-up location and determine the first departure time as 10:05 a.m.

In some embodiments, the first pick-up location and the first departure time may be transmitted to the requester terminal 130 and displayed on the requester terminal 130 (e.g., the display 320 in FIG. 3). In some embodiments, the requester terminal 130 may display the first pick-up location and the first departure time in a format of text, image, video, sound, or the like, or any combination thereof. For example, the requester terminal 130 may display a text showing "Please arrive at National Library at or before 10:05 a.m." As another example, the requester terminal 130 may display the first pick-up location on a map of the requester terminal 130.

The provider determination module 430 may determine a target service provider based on the pending transportation service (e.g., the first pick-up location, the first departure time, and the first destination). In some embodiments, the target service provider may be a service provider that is providing one or more shareable transportation services (also referred to as a working service provider). As used herein, a shareable transportation service refers to a transportation service that has been accepted by a service provider, has not been completed, and is allowed to be combined with one or more other transportation services. In some embodiments, the target service provider may be a service provider that is providing no transportation service at that moment (also referred to as an idle service provider). Details regarding the determination of the target service provider may be found elsewhere in the present disclosure (e.g., FIGS. 6-11 and the description thereof).

In some embodiments, if the target service provider is providing one or more shareable transportation services, the pending transportation service and the one or more shareable transportation services may be combined as a carpool transportation service. The carpool transportation service may refer to an arrangement that combines two or more transportation services into a new transportation service. For example, the server 110 may combine two taxi services into a new transportation service. As another example, the server 110 may combine two delivery services into a new transportation services. As still another example, the server 110 may combine a taxi service and a delivery service into a new transportation service.

The I/O module 410 (or the processing engine 112, and/or the interface circuits 210-*a*) may transmit information relating to the target service provider to the service requester. In some embodiments, the I/O module 410 may transmit the information relating to the target service provider to a terminal (e.g., the requester terminal 130) associated with the service requester.

In some embodiments, the requester terminal 130 (e.g., the display 320 in FIG. 3) may display the information relating to the target service provider, such as the name of the target service provider, the gender of the target service provider, the phone number of the target service provider, the plate number of a vehicle of the target service provider, a picture of the target service provider, a real-time location of the target service provider, a travel distance from the real-time location of the target service provider to the first pick-up location, a driving time of the target service provider from the real-time location of the target service provider to the first pick-up location, an estimated time of arrival (ETA)

of the target service provider to the first pick-up location, or the like, or any combination thereof.

In some embodiments, the requester terminal 130 (e.g., the display 320 in FIG. 3) may display information relating to the one or more shareable transportation services that are being provided by the target service provider, such as a pick-up location of at least one of the one or more shareable transportation services, a destination of at least one of the one or more shareable transportation services, a departure time from the pick-up location of at least one of the one or more shareable transportation services, the number of passengers of at least one of the one or more shareable transportation services, or the like, or any combination thereof.

Figure 5:
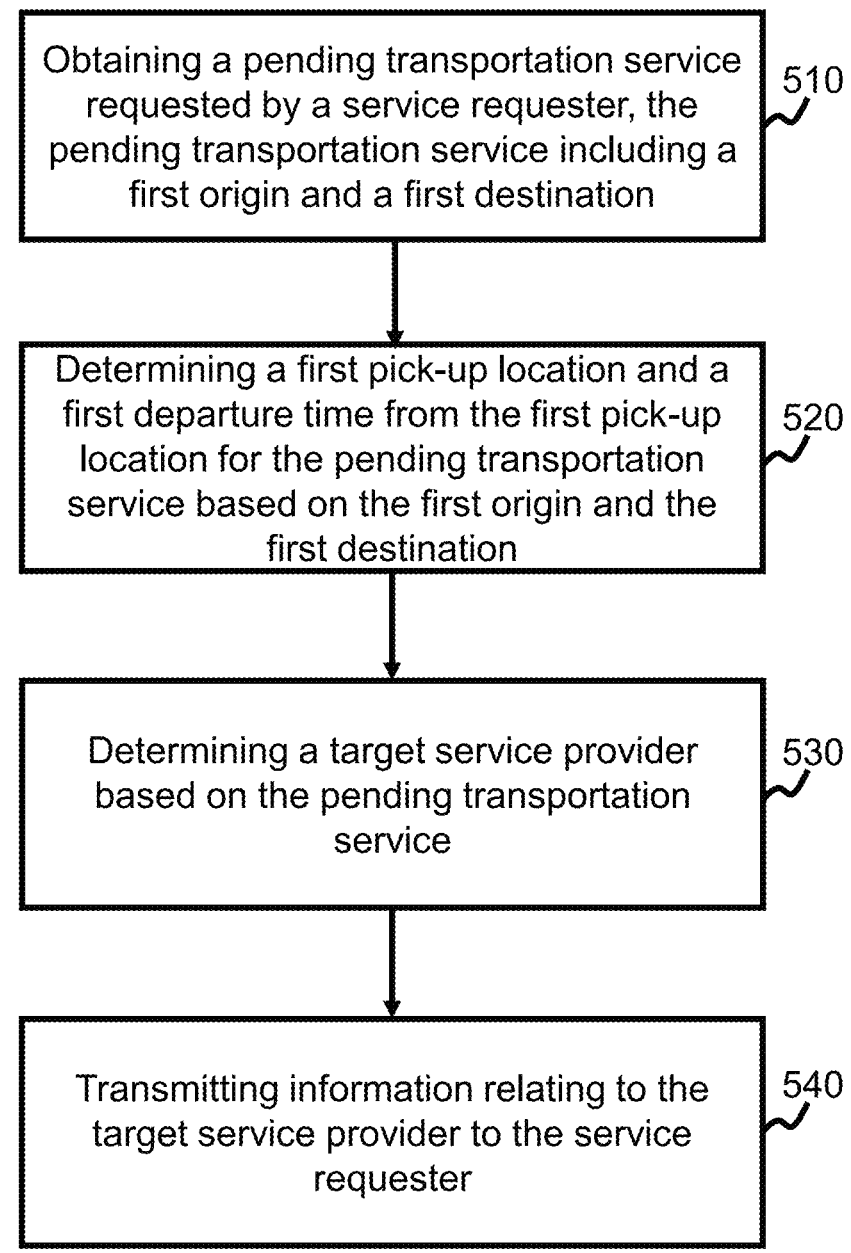
FIG. 5 is a flowchart illustrating an exemplary process of determining a target service provider for a service requester according to some embodiments of the present disclosure.

FIG. 5 is a flowchart illustrating an exemplary process for determining a target service provider for a service requester according to some embodiments of the present disclosure. Process 500 may be implemented in the on-demand service system 100 illustrated in FIG. 1. For example, process 500 may be stored in the storage device 150 and/or the storage 220 as a form of instructions (e.g., an application), and invoked and/or executed by the server 110 (e.g., the processing engine 112 of the server 110, the processor 210 illustrated in FIG. 2, or one or more modules in the processing engine 112 illustrated in FIG. 4). The operations of the illustrated process presented below are intended to be illustrative. In some embodiments, process 500 may be accomplished with one or more additional operations not described, and/or without one or more of the operations discussed. Additionally, the order in which the operations of process 500 as illustrated in FIG. 5 and described below is not intended to be limiting.

In 510, the I/O module 410 (or the processing engine 112, and/or the interface circuits 210-a) may obtain a pending transportation service requested by a service requester. In some embodiments, the pending transportation service refers to a transportation service that has not been accepted by a service provider.

In some embodiments, a transportation service may be a service of taking a subject from one location to another location using a vehicle. The subject may include passengers and/or goods. For example, the transportation service may be a taxi service or a delivery service. The vehicle relating to the transportation service may include a taxi, a private car, a hitch, a bus, a bike, an electric bicycle, a tricycle, a motorcycle, a train, a bullet train, a high-speed rail, a subway, a vessel, an aircraft, a spaceship, a hot-air balloon, a driverless vehicle, or the like, or any combination thereof.

In some embodiments, the I/O module 410 may receive the pending transportation service from a terminal associated with the service requester (e.g., the requester terminal 130). In some embodiments, the requester terminal 130 (and/or the provider terminal 140) may establish a communication (e.g., wireless communication) with the server 110, through an application (e.g., the application 380 in FIG. 3) installed in the requester terminal 130 (and/or the provider terminal 140) via the network 120. The application may associate with the on-demand service system 100. For example, the application may be a taxi-hailing application associated with the on-demand service system 100.

The pending transportation service may include a first origin and a first destination. In some embodiments, the first origin and/or the first destination may be a specified location input by the service requester through the requester terminal 130 (e.g., the I/O 350 in FIG. 3). In some embodiments, the requester terminal 130 may automatically obtain the first origin and/or the first destination. For example, an event such as "A meeting at location A at 10:00 a.m. on Oct. 13, 2017" is recorded in a calendar in the requester terminal 130. The requester terminal 130 may automatically determine location A as the first destination based on the event in the calendar. In some embodiments, the requester terminal 130 may obtain its location (which is referred to as the location of the service requester) herein through a positioning technology in the requester terminal 130, for example, the GPS, GLONASS, COMPASS, QZSS, BDS, WiFi positioning technology, or the like, or any combination thereof. The application installed in the requester terminal 130 may direct the requester terminal 130 to transmit, continuously or periodically, the real-time location of the service requester to the server 110. Consequently, the server 110 may acquire the location of the service requester in real-time or substantially real-time. The first origin may be a real-time location, corresponding to the time point when the I/O module 410 obtains the pending transportation service, of the service requester obtained by the requester terminal 130 through a positioning technology (e.g., GPS).

In some embodiments, the pending transportation service may correspond to a service request (also referred to as a transaction request or a request). In some embodiments, the service request may be formally sent out by the service requester through the requester terminal 130. For example, when the service requester initiates the pending transportation service by sending out the first origin and the first destination to the I/O module 410, the service requester may do so by pressing a button on an interface of the application installed in the requester terminal 130. Upon receiving the first origin and the first destination, the I/O module 410 may determine that the pending transportation service has been sent out and determine the pending transportation service as a request.

In some embodiments, the pending transportation service may correspond to an intention of the service requester. The application installed in the requester terminal 130 may direct the requester terminal 130 to monitor, continuously or periodically, input from the service requester and send the input to the on-demand service system 100. Consequently, the requester terminal 130 may inform the service requester's input to the on-demand service system 100 in real-time or substantially real-time. As a result, when the service requester input the first origin and/or the first destination, the on-demand service system 100 may receive enough information to determine an intention of the service requester. For example, when the service requester inputs the first origin and the first destination, and before sending out the first origin and the first destination to the on-demand service system 100, the on-demand service system 100 may have already received the first origin and the first destination, and determine that the service requester intends to request a transportation service.

In some embodiments, the pending transportation service may be a real-time transportation service or a transportation service appointment. As used herein, a real-time transportation service may be a service that the requester wishes to conduct the requested transaction (e.g., transportation service) at the present moment or at a defined time reasonably close to the present moment for an ordinary person in the art, so that a service provider is required to depart immediately or substantially immediately after the on-demand service system 100 receives the service request. For example, an intention may be for real-time transportation service if the defined time is shorter than a threshold value, such as 1 minute, 5 minutes, or 10 minutes. The transportation service that needs to make an appointment refers to a service that the requester wishes to conduct the requested transaction at a defined time which is reasonably far from the present moment for the ordinary person in the art, so that a service provider is not required to depart immediately or substantially immediately after the on-demand service system 100 receives the service request. For example, a transportation service may need an appointment if the defined time is longer than a threshold value, such as 20 minutes, 2 hours, or 1 day.

In 520, the service information determination module 420 (or the processing engine 112, and/or the processing circuits 210-*b*) may determine a first pick-up location and a first departure time from the first pick-up location for the pending transportation service based on the first origin and the first destination.

In some embodiments, the processing engine 112 may determine a plurality of candidate pick-up locations in advance and store the plurality of candidate pick-up locations in the storage device 150 and/or the storage 220. The service information determination module 420 may select one of the plurality of candidate pick-up locations as the first pick-up location. For example, the service information determination module 420 may select a candidate pick-up location that has the shortest travel distance from the first origin to the candidate pick-up location among the plurality of candidate pick-up locations. As used herein, a travel distance refers to a length of a route from one location to another location.

In some embodiments, the service information determination module 420 may select two or more candidate pick-up locations from the plurality of candidate pick-up locations. The I/O module 410 may transmit the selected candidate pick-up locations to the requester terminal 130. The service requester may select one of the selected candidate pick-up locations. The service information determination module 420 may determine the candidate pick-up location selected by the service requester as the first pick-up location.

In some embodiments, the service information determination module 420 may determine an estimated time of arrival from the first origin to the first pick-up location based on a route (e.g., a length of the route, a road condition of the route) from the first origin to the first pick-up location. The service information determination module 420 may determine the first departure time based on the estimated time of arrival from the first origin to the first pick-up location. For example, the current time (e.g., the time point when the I/O module 410 obtains the first transportation service) is 9:57 a.m. The service information determination module 420 may determine that the travel distance from the first origin to the first pick-up location is 250 meters and estimate the walking time for the service requester from the first origin to the first pick-up location is 3 minutes. The service information determination module 420 may determine that the estimated time of arrival from the first origin to the first pick-up location is 10:00 a.m. The service information determination module 420 may add a time period (also referred to as a buffer time), such as 5 minutes, to the estimated time of arrival from the first origin to the first pick-up location and determine the first departure time as 10:05 a.m.

In some embodiments, the first pick-up location and the first departure time may be transmitted to the requester terminal 130 and displayed on the requester terminal 130 (e.g., the display 320 in FIG. 3). In some embodiments, the requester terminal 130 may display the first pick-up location and the first departure time in a format of text, image, video, sound, or the like, or any combination thereof. For example, the requester terminal 130 may display a text showing "Please arrive at National Library at or before 10:05 a.m." As another example, the requester terminal 130 may display the first pick-up location on a map of the requester terminal 130.

In 530, the provider determination module 430 (or the processing engine 112, and/or the processing circuits 210-*b*) may determine a target service provider based on the pending transportation service (e.g., the first pick-up location, the first departure time, and the first destination). In some embodiments, the target service provider may be a service provider that is providing one or more shareable transportation services (also referred to as a working service provider). As used herein, a shareable transportation service refers to a transportation service that has been accepted by a service provider, has not been completed, and is allowed to be combined with one or more other transportation services. In some embodiments, the target service provider may be a service provider that is providing no transportation service at that moment (also referred to as an idle service provider). Details regarding the determination of the target service provider may be found elsewhere in the present disclosure (e.g., FIGS. 6-11 and the description thereof).

In some embodiments, if the target service provider is providing one or more shareable transportation services, the pending transportation service and the one or more shareable transportation services may be combined as a carpool transportation service. The carpool transportation service may refer to an arrangement that combines two or more transportation services into a new transportation service. For example, the server 110 may combine two taxi services into a new transportation service. As another example, the server 110 may combine two delivery services into a new transportation services. As still another example, the server 110 may combine a taxi service and a delivery service into a new transportation service.

In 540, the I/O module 410 (or the processing engine 112, and/or the interface circuits 210-*a*) may transmit information relating to the target service provider to the service requester. In some embodiments, the I/O module 410 may transmit the information relating to the target service provider to a terminal (e.g., the requester terminal 130) associated with the service requester.

In some embodiments, the requester terminal 130 (e.g., the display 320 in FIG. 3) may display the information relating to the target service provider, such as the name of the target service provider, the gender of the target service provider, the phone number of the target service provider, the plate number of a vehicle of the target service provider, a picture of the target service provider, a real-time location of the target service provider, a travel distance from the real-time location of the target service provider to the first pick-up location, a driving time of the target service provider from the real-time location of the target service provider to the first pick-up location, an estimated time of arrival (ETA) of the target service provider to the first pick-up location, or the like, or any combination thereof.

In some embodiments, the requester terminal 130 (e.g., the display 320 in FIG. 3) may display information relating to the one or more shareable transportation services that are being provided by the target service provider, such as a pick-up location of at least one of the one or more shareable transportation services, a destination of at least one of the one or more shareable transportation services, a departure time from the pick-up location of at least one of the one or more shareable transportation services, the number of passengers of at least one of the one or more shareable transportation services, or the like, or any combination thereof.

Figure 6:
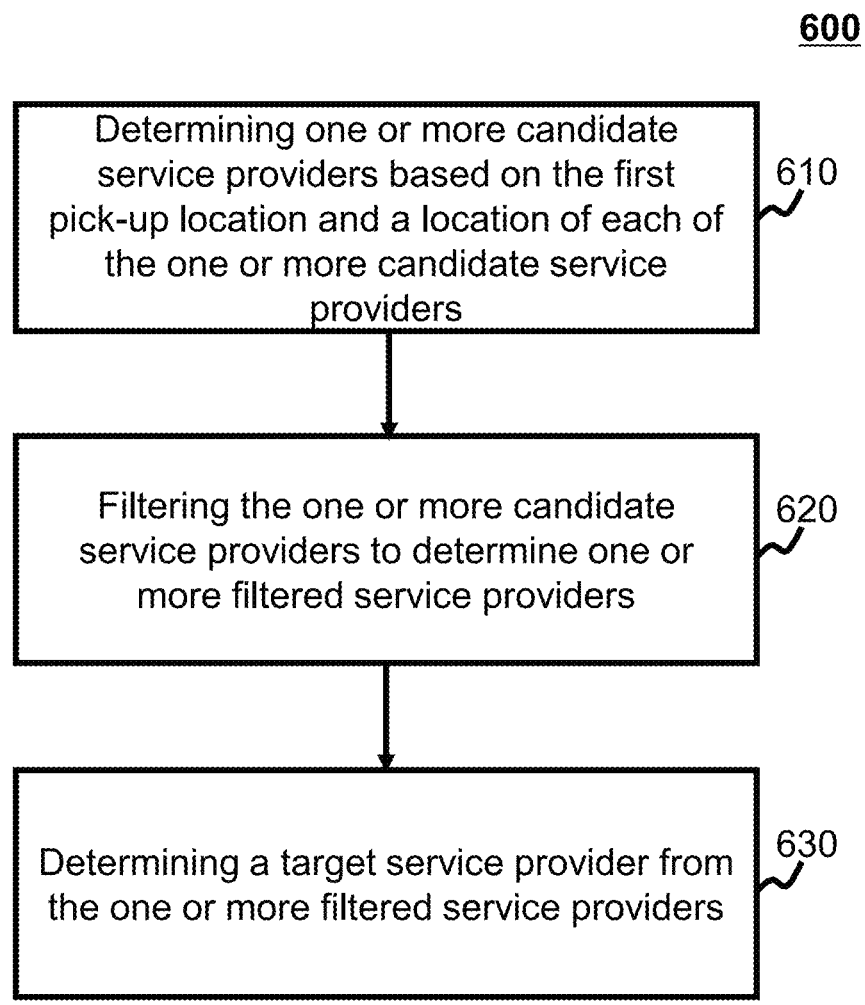
FIG. 6 is a flowchart illustrating an exemplary process of determining a target service provider according to some embodiments of the present disclosure.

FIG. 6 is a flowchart illustrating an exemplary process of determining a target service provider according to some embodiments of the present disclosure. Process 600 may be implemented in the on-demand service system 100 illustrated in FIG. 1. For example, process 600 may be stored in the storage device 150 and/or the storage 220 as a form of instructions (e.g., an application), and invoked and/or executed by the server 110 (e.g., the processing engine 112 of the server 110, the processor 210 illustrated in FIG. 2, or one or more modules in the processing engine 112 illustrated in FIG. 4). The operations of the illustrated process presented below are intended to be illustrative. In some embodiments, process 600 may be accomplished with one or more additional operations not described, and/or without one or more of the operations discussed. Additionally, the order in which the operations of process 600 as illustrated in FIG. 6 and described below is not intended to be limiting. In some embodiments, step 530 of process 500 illustrated in FIG. 5 may be performed according to process 600.

In this disclosure, a carpool transportation service of combining two transportation services into a new transportation service is taken for example. It should be noted that the carpool transportation service of combining two transportation services into a new transportation service is merely provided for the purposes of illustration, and not intended to limit the scope of the present disclosure. In some embodiments, this disclosure may be applied to a carpool transportation service of combining more than two transportation services into a new transportation service.

In this disclosure, a real-time transportation service is taken for example. It should be noted that the real-time transportation service is merely provided for the purposes of illustration, and not intended to limit the scope of the present disclosure. In some embodiments, this disclosure may be applied to a transportation service appointment.

In 610, the provider determination module 430 (or the processing engine 112, and/or the processing circuits 210-b) may determine one or more candidate service providers based on the first pick-up location and a location of each of the one or more candidate service providers.

In some embodiments, the provider terminal 140 may obtain its location (which is referred to as the location of the candidate service provider) herein through a positioning technology in the provider terminal 140, for example, the GPS, GLONASS, COMPASS, QZSS, BDS, WiFi positioning technology, or the like, or any combination thereof. The application installed in the provider terminal 140 may direct the provider terminal 140 to transmit, continuously or periodically, the real-time location of the candidate service provider to the server 110. Consequently, the server 110 may acquire the location of the candidate service provider in real-time or substantially real-time. The location of a candidate service provider may be a real-time location, corresponding to the time point when the I/O module 410 obtains the pending transportation service, obtained by the provider terminal 140 through a positioning technology (e.g., GPS).

In some embodiments, the provider determination module 430 may determine a plurality of first locations according to a predetermined distance (e.g., 3 kilometers) and the first pick-up location. A distance between each of the plurality of first locations and the first pick-up location (e.g., a travel distance from each of the plurality of first locations to the first pick-up location or a straight-line distance between each of the plurality of first locations and the first pick-up location) may be less than the predetermined distance. The provider determination module 430 may determine a first region including the plurality of first locations. Additionally or alternatively, the provider determination module 430 may determine a plurality of second locations according to a predetermined period (e.g., 5 minutes) and the first pick-up location. The driving time from each of the plurality of second locations to the first pick-up location may be within the predetermined time period. The provider determination module 430 may determine a second region including the plurality of second locations. The working service providers and/or idle service providers of which the locations corresponding to the time point when the I/O module 410 obtains the pending transportation service are in the first region and/or the second region may be chosen as the candidate service providers. A distance between the first pick-up location and the location of each of the one or more candidate service providers (e.g., a travel distance from the location of each of the one or more candidate service providers to the first pick-up location or a straight-line distance between the location of each of the one or more candidate service providers and the first pick-up location) may be less than the predetermined distance, or a driving time from the location of each of the one or more candidate service providers to the first pick-up location may be less than the predetermined time period.

In some embodiments, if there is no candidate service provider included in the region, the I/O module 410 may transmit, to the requester terminal 130 associated with the service requester, a message indicating that there is no available service provider for the first transportation service.

In 620, the provider determination module 430 (or the processing engine 112, and/or the processing circuits 210-b) may filter the one or more candidate service providers to determine one or more filtered service providers.

In some embodiments, if there is no working service provider in the one or more candidate service providers, the provider determination module 430 may determine the one or more filtered service providers based on the distance between the first pick-up location and the location of each of the one or more candidate service providers (e.g., a travel distance from the location of each of the one or more candidate service providers to the first pick-up location or a straight-line distance between the location of each of the one or more candidate service providers and the first pick-up location), and/or the driving time from the location of each of the one or more candidate service provider to the first pick-up location. For example, the provider determination module 430 may rank the one or more candidate service providers in ascending order of the straight-line distances between the first pick-up location and the location of each of the one or more candidate service providers. The provider determination module 430 may determine the top 5 candidate service providers as the filtered service providers.

In some embodiments, if there is at least one working service provider in the one or more candidate service providers, the provider determination module 430 may determine the one or more filtered service providers from the at least one working service providers based on at least one of: the first pick-up location, the first departure time, the first destination, a second pick-up location of a candidate transportation service associated with at least one of the one or more candidate service providers (e.g., the at least one working service provider), a second departure time from the second pick-up location of the candidate transportation service associated with the at least one of the one or more candidate service providers, a second destination of the candidate transportation service associated with the at least one of the one or more candidate service providers, or the location of the at least one of the one or more candidate service providers. A candidate transportation service associated with a candidate service provider refers to a shareable transportation service that is being provided by the candidate service provider when the I/O module 410 obtains the pending transportation service. Details regarding the determination of the one or more filtered service providers may be found elsewhere in the present disclosure. (e.g., FIGS. 7-11 and the description thereof).

In some embodiments, if there is no working service provider to be determined as the one or more filtered service providers, the provider determination module 430 may determine the one or more filtered service providers from the idle service providers. If there is no working service provider to be determined as the one or more filtered service providers and there is no idle service provider among the one or more candidate service providers, the I/O module 410 may transmit, to the requester terminal 130 associated with the service requester, a message indicating that there is no available service provider for the first transportation service.

In 630, the provider determination module 430 (or the processing engine 112, and/or the processing circuits 210-b) may determine a target service provider from the one or more filtered service providers.

In some embodiments, if the pending transportation service corresponds to a request, the I/O module 410 may transmit the pending transportation service to the one or more filtered service providers. In some embodiments, if the pending transportation service corresponds to an intention, the I/O module 410 may transmit the pending transportation service to the one or more filtered service providers after the service requester transmits a request of the pending transportation service to the processing engine 112.

In some embodiments, the provider determination module 430 may determine whether the number of the one or more filtered service providers is greater than a threshold number (e.g., 5). The I/O module 410 may transmit the pending transportation service to the one or more filtered service providers in response to a determination that the number of the one or more filtered service providers is less than or equal to the threshold number. The I/O module 410 may transmit the pending transportation service to a portion of the one or more filtered service providers in response to a determination that the number of the one or more filtered service providers is greater than the threshold number. Merely by way of example, the provider determination module 430 may determine a score for each of the one or more filtered service providers based on the results relating to processes 700-1100. For example, the shorter a time difference, corresponding to a filtered service provider, between an ETA of the filtered service provider to the first pick-up location and the first departure time is, the higher the score of the filtered service provider may be. The provider determination module 430 may rank the one or more filtered service providers in descending order based on the scores of the one or more filtered service providers. The I/O module 410 may transmit the pending transportation service to the top 5 filtered service providers.

In some embodiments, the provider determination module 430 may determine the filtered service provider that is the first to accept the pending transportation service as the target service provider.

Figure 7:
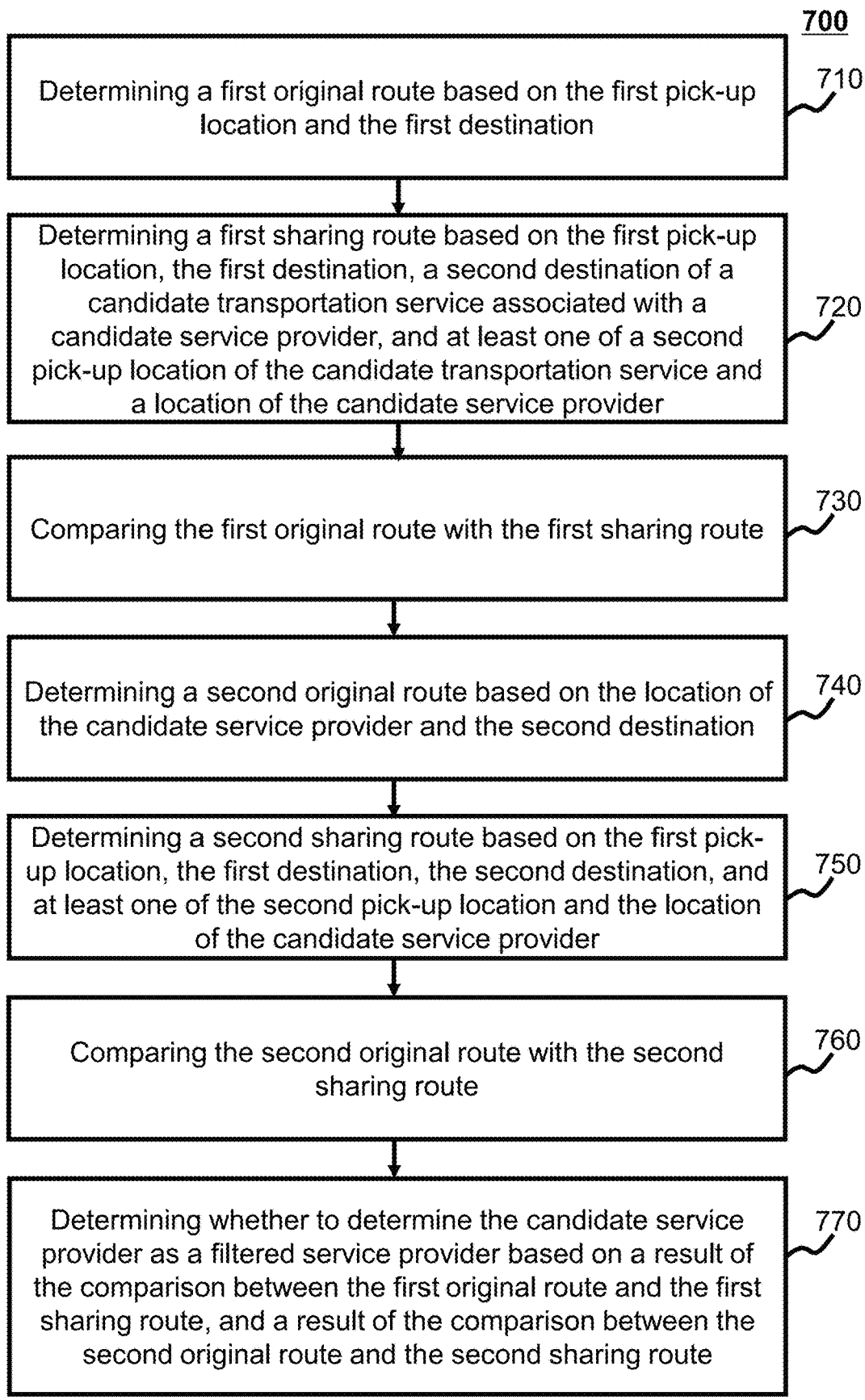
FIG. 7 is a flowchart illustrating an exemplary process of selecting a candidate service provider according to some embodiments of the present disclosure.

FIG. 7 is a flowchart illustrating an exemplary process for selecting a candidate service provider according to some embodiments of the present disclosure. Process 700 may be implemented in the on-demand service system 100 illustrated in FIG. 1. For example, process 700 may be stored in the storage device 150 and/or the storage 220 as a form of instructions (e.g., an application), and invoked and/or executed by the server 110 (e.g., the processing engine 112 of the server 110, the processor 210 illustrated in FIG. 2, or one or more modules in the processing engine 112 illustrated in FIG. 4). The operations of the illustrated process presented below are intended to be illustrative. In some embodiments, process 700 may be accomplished with one or more additional operations not described, and/or without one or more of the operations discussed. Additionally, the order in which the operations of process 700 as illustrated in FIG. 7 and described below is not intended to be limiting. In some embodiments, step 620 of process 600 illustrated in FIG. 6 may be performed according to process 700. For one of the one or more candidate service providers, the server 110 may perform process 700 to determine whether to determine the candidate service provider as a filtered service provider. The server 110 may filter at least one of the one or more candidate service providers one by one or simultaneously.

In 710, the provider determination module 430 (or the processing engine 112, and/or the processing circuits 210-b) may determine a first original route based on the first pick-up location and the first destination.

In some embodiments, the first original route may refer to a route from the first pick-up location to the first destination in a condition that the pending transportation service is not combined with other transportation services. In some embodiments, the provider determination module 430 may select, from a plurality of candidate routes from the first pick-up location to the first destination, a route as the first original route. For example, the first original route may be a route having the shortest length among the candidate routes from the first pick-up location to the first destination. As another example, the first original route may be a route having the shortest driving time among the candidate routes from the first pick-up location to the first destination.

In 720, the provider determination module 430 (or the processing engine 112, and/or the processing circuits 210-b) may determine a first sharing route based on the first pick-up location, the first destination, a second destination of a candidate transportation service associated with a candidate service provider, and at least one of a second pick-up location of the candidate transportation service and a location of the candidate service provider. In some embodiments, the first sharing route may refer to a route from the first pick-up location to the first destination in a condition that the pending transportation service is combined with the candidate transportation service. In some embodiments, the location of the candidate service provider may be a real-time location corresponding to a time point when the I/O module 410 obtains the pending transportation service.

In some embodiments, the candidate transportation service may correspond to a service request that has been accepted by the candidate service provider. For example, when the I/O module 410 obtains the pending transportation service, the candidate service provider (e.g., a driver) may be on the way to the second pick-up location to pick-up one or more passengers of the candidate transportation service. As another example, when the I/O module 410 obtains the pending transportation service, the candidate service provider (e.g., a driver) may be waiting for one or more passengers of the candidate transportation service at the second pick-up location. As still another example, when the I/O module 410 obtains the pending transportation service, the candidate service provider (e.g., a driver) may have picked up one or more passengers of the candidate transportation service and be on the way to the second destination.

In some embodiments, the provider determination module 430 may determine a combination route that passes through the first pick-up location, the first destination, the second destination, and at least one of the second pick-up location and the location of the candidate service provider. For example, if the candidate service provider is on the way to the second pick-up location when the I/O module 410 obtains the pending transportation service, the provider determination module 430 may determine a combination route that passes through the location of the candidate service provider, the second pick-up location, the second destination, the first pick-up location, and the first destination. As another example, if the candidate service provider arrives at the second pick-up location when the I/O module 410 obtains the pending transportation service, the provider determination module 430 may determine a combination route that passes through the second pick-up location, the second destination, the first pick-up location, and the first destination. As still another example, if the candidate service provider is on the way to the second destination when the I/O module 410 obtains the pending transportation service, the provider determination module 430 may determine a combination route that passes through the location of the candidate service provider, the second destination, the first pick-up location, and the first destination.

In some embodiments, the provider determination module 430 may select, from a plurality of candidate routes that pass through the first pick-up location, the first destination, the second destination, and at least one of the second pick-up location and the location of the candidate service provider, a route as the combination route. For example, the combination route may be a route having the shortest length among the candidate routes that pass through the first pick-up location, the first destination, the second destination, and at least one of the second pick-up location and the location of the candidate service provider. As another example, the combination route may be a route having the shortest driving time among the candidate routes that pass through the first pick-up location, the first destination, the second destination, and at least one of the second pick-up location and the location of the candidate service provider.

The provider determination module 430 may select a first portion of the combination route as the first sharing route. The first portion of the combination route may be from the first pick-up location to the first destination.

In 730, the provider determination module 430 (or the processing engine 112, and/or the processing circuits 210-b) may compare the first original route with the first sharing route to determine whether the candidate service provider will make a detour from the first pick-up location to the first destination in a condition that the pending transportation service is combined with the candidate transportation service. The provider determination module 430 may also determine whether the detour from the first pick-up location to the first destination (also referred to as a first detour) exceeds a threshold.

In some embodiments, the first detour may be determined according to the lengths of the first original route and the first original route. For example, the provider determination module 430 may compare the first original route with the first sharing route based on lengths of the first original route and the first sharing route. The provider determination module 430 may determine a first length difference between the length of the first original route and the length of the first sharing route, and determine whether the absolute value of the first length difference is less than a first threshold length (e.g., 3 kilometers (km)). In some embodiments, the first length difference may be in a range of 0.1 to 50 km. In some embodiments, the first length difference may be restricted in subranges of 0.1 to 1 km, 1 to 2 km, 2 to 5 km, 5 to 10 km, 10 to 20 km, or 20 to 50 km. The provider determination module 430 may determine that the first detour is within a threshold in response to a determination that the absolute value of the first length difference is less than the first threshold length. As another example, the provider determination module 430 may determine a first length percentage by dividing the first length difference by the length of the first original route. The provider determination module 430 may determine whether the first length percentage is less than a first threshold length percentage (e.g., 5%). In some embodiments, the first threshold length percentage may be in a range of 1% to 50%. In some embodiments, the first threshold length percentage may be restricted in subranges of 1% to 5%, 5% to 10%, 10% to 20%, or 20% to 50%. The provider determination module 430 may determine that the first detour is within a threshold in response to a determination that the first length percentage is less than the first threshold length percentage. As still another example, the provider determination module 430 may determine a first length ratio between the length of the first original route and the length of the first sharing route. The provider determination module 430 may determine whether the first length ratio is greater than a first threshold length ratio (e.g., 0.8) if the first length ratio is determined by dividing the length of the first original route by the length of the first sharing route. In some embodiments, the first threshold length ratio may be in a range of 0.5 to 1. In some embodiments, the first threshold length ratio may be restricted in subranges of 0.5 to 0.55, 0.55 to 0.6, 0.6 to 0.7, or 0.7 to 1. The provider determination module 430 may determine that the first detour is within a threshold in response to a determination that the first length ratio is greater than the first threshold length ratio. Alternatively, the provider determination module 430 may determine whether the first length ratio is less than a second threshold length ratio (e.g., 1.25) if the first length ratio is determined by dividing the length of the first sharing route by the length of the first original route. In some embodiments, the second threshold length ratio may be in a range of 1 to 1.5. In some embodiments, the second threshold length ratio may be restricted in subranges of 1 to 1.05, 1.05 to 1.1, 1.1 to 1.2, or 1.2 to 1.5. The provider determination module 430 may determine that the first detour is within a threshold in response to a determination that the first length ratio is less than the second threshold length ratio.

Alternatively or additionally, the first detour may be determined according to the travel periods of the first original route and the first sharing route. For example, the provider determination module 430 may determine a first time difference between the driving time of the first original route and the driving time of the first sharing route, and determine whether the absolute value of the first time difference is less than a first threshold time (e.g., 10 minutes). In some embodiments, the first threshold time may be in a range of 0 to 50 minutes. In some embodiments, the first threshold time may be restricted in subranges of 0 to 5 minutes, 5 to 10 minutes, 10 to 20 minutes, or 20 to 50 minutes. The provider determination module 430 may determine that the first detour is within a threshold in response to a determination that the absolute value of the first time difference is less than the first threshold time. As another example, the provider determination module 430 may determine a first time percentage by dividing the first time difference by the driving time of the first original route. The provider determination module 430 may determine whether the first time percentage is less than a first threshold time percentage (e.g., 5%). In some embodiments, the first threshold time percentage may be in a range of 1% to 50%. In some embodiments, the first threshold time percentage may be restricted in subranges of 1% to 5%, 5% to 10%, 10% to 20%, or 20% to 50%. The provider determination module 430 may determine that the first detour is within a threshold in response to a determination that the first time percentage is less than the first threshold time percentage. As still another example, the provider determination module 430 may determine a first time ratio between the driving time of the first original route and the driving time of the first sharing route. The provider determination module 430 may determine whether the first time ratio is greater than a first threshold time ratio (e.g., 0.8) if the first time ratio is determined by dividing the driving time of the first original route by the driving time of the first sharing route. In some embodiments, the first threshold time ratio may be in a range of 0.5 to 1. In some embodiments, the first threshold time ratio may be restricted in subranges of 0.5 to 0.55, 0.55 to 0.6, 0.6 to 0.7, or 0.7 to 1. The provider determination module 430 may determine that the first detour is within a threshold in response to a determination that the first time ratio is greater than the first threshold time ratio. Alternatively, the provider determination module 430 may determine whether the first time ratio is less than a second threshold time ratio (e.g., 1.25) if the first time ratio is determined by dividing the driving time of the first sharing route by the driving time of the first original route. In some embodiments, the second threshold time ratio may be in a range of 1 to 1.5. In some embodiments, the second threshold time ratio may be restricted in subranges of 1 to 1.05, 1.05 to 1.1, 1.1 to 1.2, or 1.2 to 1.5. The provider determination module 430 may determine that the first detour is within a threshold in response to a determination that the first time ratio is less than the second threshold time ratio.

Alternatively or additionally, the first detour may be determined according to a combination of the travel periods and lengths of the first original route and the first sharing route. For example, the provider determination module 430 may determine that the first detour is within a threshold in response to a determination that the absolute value of the first length difference is less than the first threshold length and a determination that the absolute value of the first time difference is less than the first threshold time.

In 740, the provider determination module 430 (or the processing engine 112, and/or the processing circuits 210-*b*) may determine a second original route based on the location of the candidate service provider and the second destination.

In some embodiments, the second original route may be a route from the location of the candidate service provider to the second destination in the condition that the candidate transportation service is not combined with other transportation services. In some embodiments, the provider determination module 430 may select, from a plurality of candidate routes from the location of the candidate service provider to the second destination, a route as the second original route. For example, the second original route may be a route having the shortest length among the candidate routes from the location of the candidate service provider to the second destination. As another example, the second original route may be a route having the shortest driving time among the candidate routes from the location of the candidate service provider to the second destination.

In 750, the provider determination module 430 (or the processing engine 112, and/or the processing circuits 210-*b*) may determine a second sharing route based on the first pick-up location, the first destination, the second destination, and at least one of the second pick-up location and the location of the candidate service provider. In some embodiments, the second sharing route may refer to a route from the location of the candidate service provider to the second destination in a condition that the pending transportation service is combined with the candidate transportation service. In some embodiments, the provider determination module 430 may select a second portion of the combination route as the second sharing route. The second portion of the combination route may be from the location of the candidate service provider to the second destination.

In 760, the provider determination module 430 (or the processing engine 112, and/or the processing circuits 210-*b*) may compare the second original route with the second sharing route to determine whether the candidate service provider will make a detour from the location of the candidate service provider to the second destination in a condition that the pending transportation service is combined with the candidate transportation service. The provider determination module 430 may also determine whether the detour from the location of the candidate service provider to the second destination (also referred to as a second detour) exceeds a threshold.

In some embodiments, the second detour may be determined according to the lengths of the second original route and the second original route. For example, the provider determination module 430 may compare the second original route with the second sharing route based on lengths of the second original route and the second sharing route. The provider determination module 430 may determine a second length difference between the length of the second original route and the length of the second sharing route, and determine whether the absolute value of the second length difference is less than a second threshold length (e.g., 3 km). In some embodiments, the second length difference may be in a range of 0.1 to 50 km. In some embodiments, the second length difference may be restricted in subranges of 0.1 to 1 km, 1 to 2 km, 2 to 5 km, 5 to 10 km, 10 to 20 km, or 20 to 50 km. The provider determination module 430 may determine that the second detour is within a threshold in response to a determination that the absolute value of the second length difference is less than the second threshold length. As another example, the provider determination module 430 may determine a second length percentage by dividing the second length difference by the length of the second original route. The provider determination module 430 may determine whether the second length percentage is less than a second threshold length percentage (e.g., 5%). In some embodiments, the second threshold length percentage may be in a range of 1% to 50%. In some embodiments, the second threshold length percentage may be restricted in subranges of 1% to 5%, 5% to 10%, 10% to 20%, or 20% to 50%. The provider determination module 430 may determine that the second detour is within a threshold in response to a determination that the second length percentage is less than the second threshold length percentage. As still another example, the provider determination module 430 may determine a second length ratio between the length of the second original route and the length of the second sharing route. The provider determination module 430 may determine whether the second length ratio is greater than a third threshold length ratio (e.g., 0.8) if the second length ratio is determined by dividing the length of the second original route by the length of the second sharing route. In some embodiments, the third threshold length ratio may be in a range of 0.5 to 1. In some embodiments, the third threshold length ratio may be restricted in subranges of 0.5 to 0.55, 0.55 to 0.6, 0.6 to 0.7, or 0.7 to 1. The provider determination module 430 may determine that the second detour is within a threshold in response to a determination that the second length ratio is less than the third threshold length ratio. Alternatively, the provider determination module 430 may determine whether the second length ratio is less than a fourth threshold length ratio (e.g., 1.25) if the second length ratio is determined by dividing the length of the second sharing route by the length of the second original route. In some embodiments, the fourth threshold length ratio may be in a range of 1 to 1.5. In some embodiments, the fourth threshold length ratio may be restricted in subranges of 1 to 1.05, 1.05 to 1.1, 1.1 to 1.2, or 1.2 to 1.5. The provider determination module 430 may determine that the second detour is within a threshold in response to a determination that the second length ratio is less than the fourth threshold length ratio.

Alternatively or additionally, the first detour may be determined according to the travel periods of the second original route and the second sharing route. For example, the provider determination module 430 may determine a second time difference between the driving time of the second original route and the driving time of the second sharing route, and determine whether the absolute value of the second time difference is less than a second threshold time (e.g., 10 minutes). In some embodiments, the second threshold time may be in a range of 0 to 50 minutes. In some embodiments, the second threshold time may be restricted in subranges of 0 to 5 minutes, 5 to 10 minutes, 10 to 20 minutes, or 20 to 50 minutes. The provider determination module 430 may determine that the second detour is within a threshold in response to a determination that the absolute value of the second time difference is less than the second threshold time. As another example, the provider determination module 430 may determine a second time percentage by dividing the second time difference by the driving time of the second original route. The provider determination module 430 may determine whether the second time percentage is less than a second threshold time percentage (e.g., 5%). In some embodiments, the second threshold time percentage may be in a range of 1% to 50%. In some embodiments, the second threshold time percentage may be restricted in subranges of 1% to 5%, 5% to 10%, 10% to 20%, or 20% to 50%. The provider determination module 430 may determine that the second detour is within a threshold in response to a determination that the second time percentage is less than the second threshold time percentage. As still another example, the provider determination module 430 may determine a second time ratio between the driving time of the second original route and the driving time of the second sharing route. The provider determination module 430 may determine whether the second time ratio is greater than a third threshold time ratio (e.g., 0.8) if the second time ratio is determined by dividing the driving time of the second original route by the driving time of the second sharing route. In some embodiments, the third threshold time ratio may be in a range of 0.5 to 1. In some embodiments, the third threshold time ratio may be restricted in subranges of 0.5 to 0.55, 0.55 to 0.6, 0.6 to 0.7, or 0.7 to 1. The provider determination module 430 may determine that the second detour is within a threshold in response to a determination that the second time ratio is greater than the third threshold time ratio. Alternatively, the provider determination module 430 may determine whether the second time ratio is less than a fourth threshold time ratio (e.g., 1.25) if the second time ratio is determined by dividing the driving time of the second sharing route by the driving time of the second original route. In some embodiments, the fourth threshold time ratio may be in a range of 1 to 1.5. In some embodiments, the fourth threshold time ratio may be restricted in subranges of 1 to 1.05, 1.05 to 1.1, 1.1 to 1.2, or 1.2 to 1.5. The provider determination module 430 may determine that the second detour is within a threshold in response to a determination that the second time ratio is less than the fourth threshold time ratio.

Alternatively or additionally, the second detour may be determined according to a combination of the travel periods and lengths of the second original route and the second sharing route. For example, the provider determination module 430 may determine that the second detour is within a threshold in response to a determination that the absolute value of the second length difference is less than the second threshold length and a determination that the absolute value of the second time difference is less than the second threshold time.

In 770, the provider determination module 430 (or the processing engine 112, and/or the processing circuits 210-b) may determine whether to determine the candidate service provider as a filtered service provider based on a result of the comparison between the first original route and the first sharing route and a result of the comparison between the second original route and the second sharing route.

In some embodiments, the provider determination module 430 may determine the candidate service provider as the filtered service provider in response to a determination that the first detour is within a threshold in a condition that the pending transportation service is combined with the candidate transportation service and a determination that the second detour is within a threshold in a condition that the pending transportation service is combined with the candidate transportation service.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, steps 740-760 may be omitted when the provider determination module 430 processes the candidate service provider by only determining whether the first detour is acceptable. As another example, steps 710-730 may be omitted when the provider determination module 430 processes the candidate service provider by only determining whether the second detour is acceptable.

Figure 8:
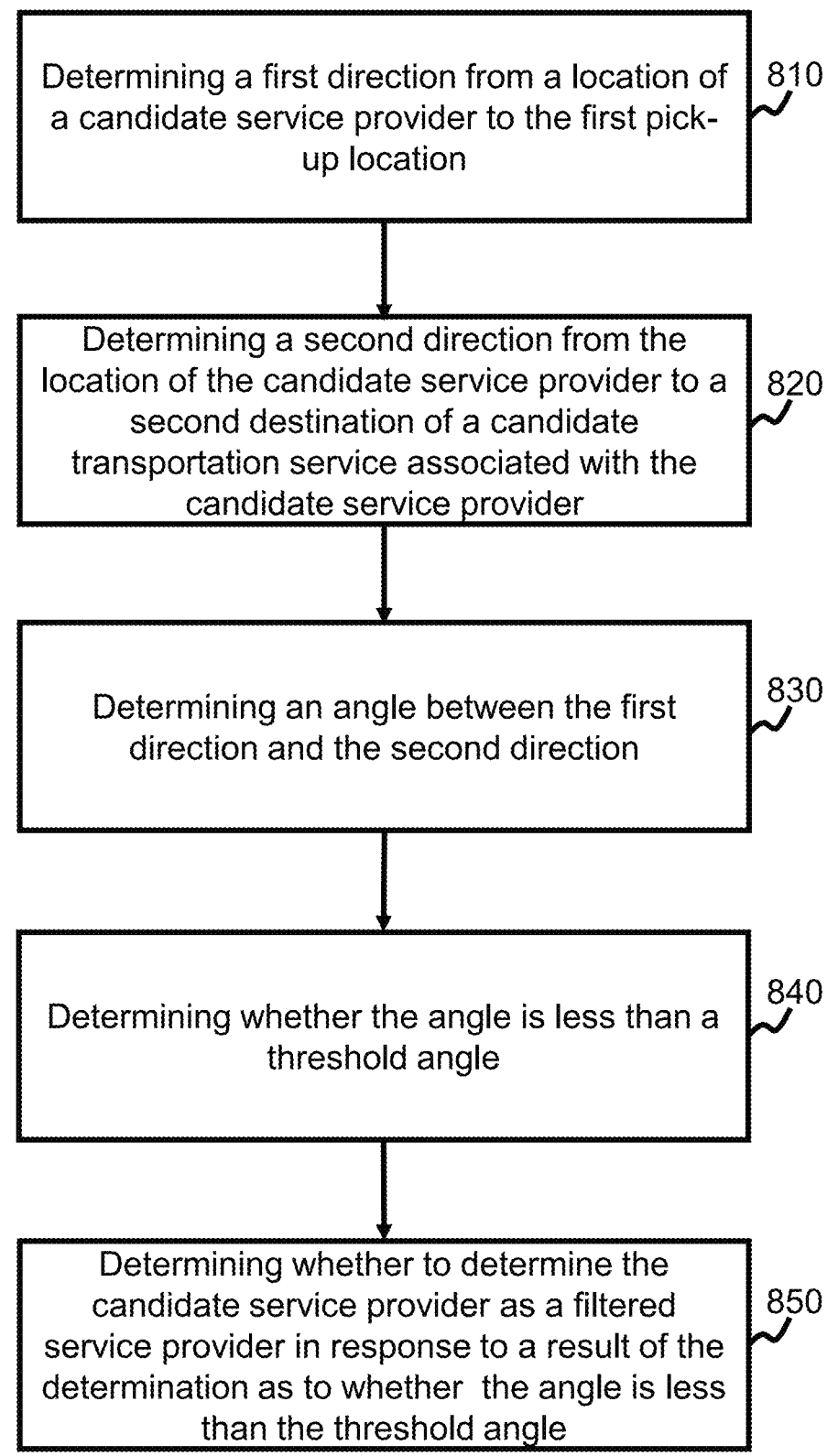
FIG. 8 is a flowchart illustrating an exemplary process of selecting a candidate service provider according to some embodiments of the present disclosure.

FIG. 8 is a flowchart illustrating an exemplary process for selecting a candidate service provider according to some embodiments of the present disclosure. Process 800 may be implemented in the on-demand service system 100 illustrated in FIG. 1. For example, process 800 may be stored in the storage device 150 and/or the storage 220 as a form of instructions (e.g., an application), and invoked and/or executed by the server 110 (e.g., the processing engine 112 of the server 110, the processor 210 illustrated in FIG. 2, or one or more modules in the processing engine 112 illustrated in FIG. 4). The operations of the illustrated process presented below are intended to be illustrative. In some embodiments, process 800 may be accomplished with one or more additional operations not described, and/or without one or more of the operations discussed. Additionally, the order in which the operations of process 800 as illustrated in FIG. 8 and described below is not intended to be limiting. In some embodiments, step 620 of process 600 illustrated in FIG. 6 may be performed according to process 800. For one of the one or more candidate service providers, the server 110 may perform process 800 to determine whether to determine the candidate service provider as a filtered service provider. The server 110 may filter at least one of the one or more candidate service providers one by one or simultaneously.

In 810, the provider determination module 430 (or the processing engine 112, and/or the processing circuits 210-*b*) may determine the first direction from a location of a candidate service provider to the first pick-up location.

In 820, the provider determination module 430 (or the processing engine 112, and/or the processing circuits 210-*b*) may determine a second direction from the location of the candidate service provider to a second destination of a candidate transportation service associated with the candidate service provider.

In 830, the provider determination module 430 (or the processing engine 112, and/or the processing circuits 210-*b*) may determine an angle between the first direction and the second direction. In some embodiments, the angle between the first direction and the second direction may be less than or equal to 180° (the angle from the first direction to the second direction or from the second direction to the first direction).

In 840, the provider determination module 430 (or the processing engine 112, and/or the processing circuits 210-*b*) may determine whether the angle is less than a threshold angle (e.g., 90°).

In 850, the provider determination module 430 (or the processing engine 112, and/or the processing circuits 210-*b*) may determine whether to determine the candidate service provider as a filtered service provider in response to a result of the determination as to whether the angle is less than the threshold angle. When the angle between the first direction and the second direction is less than the threshold angle, the candidate service provider may be determined as the filtered service provider. For example, the first pick-up location is north of the location of the candidate service provider and the second destination is north of the location of the candidate service provider. The angle between the first direction and the second direction may be 0°, which is less than the threshold angle of 90°. The provider determination module 430 may determine the candidate service provider as the filtered service provider. As another example, the first pick-up location is north of the location of the candidate service provider and the second destination is south of the location of the candidate service provider. The angle between the first direction and the second direction may be 180°, which is greater than the threshold angle of 90°. The provider determination module 430 may not determine the candidate service provider as the filtered service provider.

It should be noted that the above description is merely provided for the purpose of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, the angle between the first direction and the second direction may be greater than or equal to 180°. The provider determination module 430 may determine whether the angle is greater than a threshold (e.g., 270°). The candidate service provider may be selected as the at least one candidate service provider in response to a determination that the angle is greater than the threshold.

FIG. 9 is a flowchart illustrating an exemplary process for selecting a candidate service provider according to some embodiments of the present disclosure. Process 900 may be implemented in the on-demand service system 100 illustrated in FIG. 1. For example, process 900 may be stored in the storage device 150 and/or the storage 220 as a form of instructions (e.g., an application), and invoked and/or executed by the server 110 (e.g., the processing engine 112 of the server 110, the processor 210 illustrated in FIG. 2, or one or more modules in the processing engine 112 illustrated in FIG. 4). The operations of the illustrated process presented below are intended to be illustrative. In some embodiments, process 900 may be accomplished with one or more additional operations not described, and/or without one or more of the operations discussed. Additionally, the order in which the operations of process 900 as illustrated in FIG. 9 and described below is not intended to be limiting. In some embodiments, step 620 of process 600 illustrated in FIG. 6 may be performed according to process 900. For one of the one or more candidate service providers, the server 110 may perform process 900 to determine whether to determine the candidate service provider as a filtered service provider. The server 110 may filter at least one of the one or more candidate service providers one by one or simultaneously.

In 910, the provider determination module 430 (or the processing engine 112, and/or the processing circuits 210-*b*) may determine a first estimated time of arrival (ETA) of a candidate service provider to the first pick-up location based on a location of the candidate service provider, the first pick-up location, a second pick-up location of a candidate transportation service associated with the candidate service provider, and a second departure time of the candidate transportation service.

In some embodiments, the provider determination module 430 may determine a combination route that passes through the first pick-up location, the first destination, the second destination, and at least one of the second pick-up location and the location of the candidate service provider. For example, if the candidate service provider is on the way to the second pick-up location when the I/O module 410 obtains the pending transportation service, the provider determination module 430 may determine a combination route that passes through the location of the candidate service provider, the second pick-up location, the second destination, the first pick-up location, and the first destination. As another example, if the candidate service provider arrives at the second pick-up location when the I/O module 410 obtains the pending transportation service, the provider determination module 430 may determine a combination route that passes through the second pick-up location, the second destination, the first pick-up location, and the first destination. As still another example, if the candidate service provider is on the way to the second destination when the I/O module 410 obtains the pending transportation service, the provider determination module 430 may determine a combination route that passes through the location of the candidate service provider, the second destination, the first pick-up location, and the first destination. The provider determination module 430 may determine the first ETA of the candidate service provider to the first pick-up location based on a portion of the combination route from the location of the candidate service provider to the first pick-up location.

In some embodiments, if the second pick-up location is between the location of the candidate service provider and the first pick-up location according to the portion of the combination route from the location of the candidate service provider to the first pick-up location, which indicates that the candidate service provider will first pick up the passenger(s) of the candidate transportation service, and then pick up the passenger(s) of the pending transportation service, the provider determination module 430 may determine the first ETA of the candidate service provider to the first pick-up location based on the driving time from the location of the candidate service provider to the second pick-up location, the driving time from the second pick-up location to the first pick-up location, and the second departure time. For example, the current time is 10:00 a.m. (e.g., the time point when the I/O module 410 obtains the pending transportation service), the provider determination module 430 may determine that the driving time from the location of the candidate service provider to the second pick-up location is 5 minutes and the driving time from the second pick-up location to the first pick-up location is 3 minutes. The second departure time is 10:07 a.m. The provider determination module 430 may determine that the first ETA of the candidate service provider to the first pick-up location is 10:10 a.m. As another example, the current time is 10:00 a.m. (e.g., the time point when the I/O module 410 obtains the pending transportation service), the provider determination module 430 may determine that the driving time from the location of the candidate service provider to the second pick-up location is 5 minutes and the driving time from the second pick-up location to the first pick-up location is 3 minutes. The second departure time is 10:03 a.m. The provider determination module 430 may determine that the first ETA of the candidate service provider to the first pick-up location is 10:08 a.m.

In some embodiments, if the second pick-up location is not between the location of the candidate service provider and the first pick-up location according to the portion of the combination route from the location of the candidate service provider to the first pick-up location, which indicates that the candidate service provider will first pick up the passenger(s) of the pending transportation service, and then pick up the passenger(s) of the candidate transportation service, or the candidate service provider has picked up the passenger(s) of the candidate transportation service, the provider determination module 430 may determine the first ETA of the candidate service provider to the first pick-up location based on the driving time from the location of the candidate service provider to the first pick-up location. For example, the current time is 10:00 a.m. (e.g., the time point when the I/O module 410 obtains the pending transportation service), the provider determination module 430 may determine that the driving time from the location of the candidate service provider to the first pick-up location is 5 minutes. The provider determination module 430 may determine that the first ETA of the candidate service provider to the first pick-up location is 10:05 a.m.

In 920, the provider determination module 430 (or the processing engine 112, and/or the processing circuits 210-*b*) may determine a first time difference between the first ETA of the candidate service provider to the first pick-up location and the first departure time. In some embodiments, the provider determination module 430 may determine the first time difference by subtracting the first departure time from the first ETA of the candidate service provider to the first pick-up location.

In 930, the provider determination module 430 (or the processing engine 112, and/or the processing circuits 210-*b*) may determine whether the first time difference is less than a first threshold difference (e.g., 5 minutes). The first threshold difference may be a fixed value or may be adjustable depending on different situations. For example, in rush hour (e.g., 7:00 a.m.-9:00 a.m.), the first threshold difference may be relatively long (e.g., 6 minutes) because it may take a service provider longer time to arrive at the first pick-up location; whereas in other hours (e.g., 10:00 a.m.-12:00 a.m.), the first threshold difference may be relatively short (e.g., 2 minutes) as the service provider may need shorter time to arrive at the first pick-up location.

In 940, the provider determination module 430 (or the processing engine 112, and/or the processing circuits 210-*b*) may determine whether to determine the candidate service provider as a filtered service provider in response to a result of the determination as to whether the first time difference is less than the first threshold difference. The candidate service provider may be determined as the filtered service provider in response to a determination that the first time difference between the first ETA of the candidate service provider to the first pick-up location and the first departure time is less than the first threshold difference. For example, the first ETA of the candidate service provider to the first pick-up location is 9:58 a.m. and the first departure time is 10:00 a.m. The first time difference between the first ETA of the candidate service provider to the first pick-up location and the first departure time may be 2 minutes, which is less than the first threshold difference of 5 minutes. The provider determination module 430 may determine the candidate service provider as the filtered service provider. As another example, the first ETA of the candidate service provider to the first pick-up location is 4:52 p.m. and the first departure time is 5:00 p.m. The first time difference between the first ETA of the candidate service provider to the first pick-up location and the first departure time may be 8 minutes, which is greater than the first threshold difference of 5 minutes. The provider determination module 430 may not determine the candidate service provider as a filtered service provider.

Figure 10:
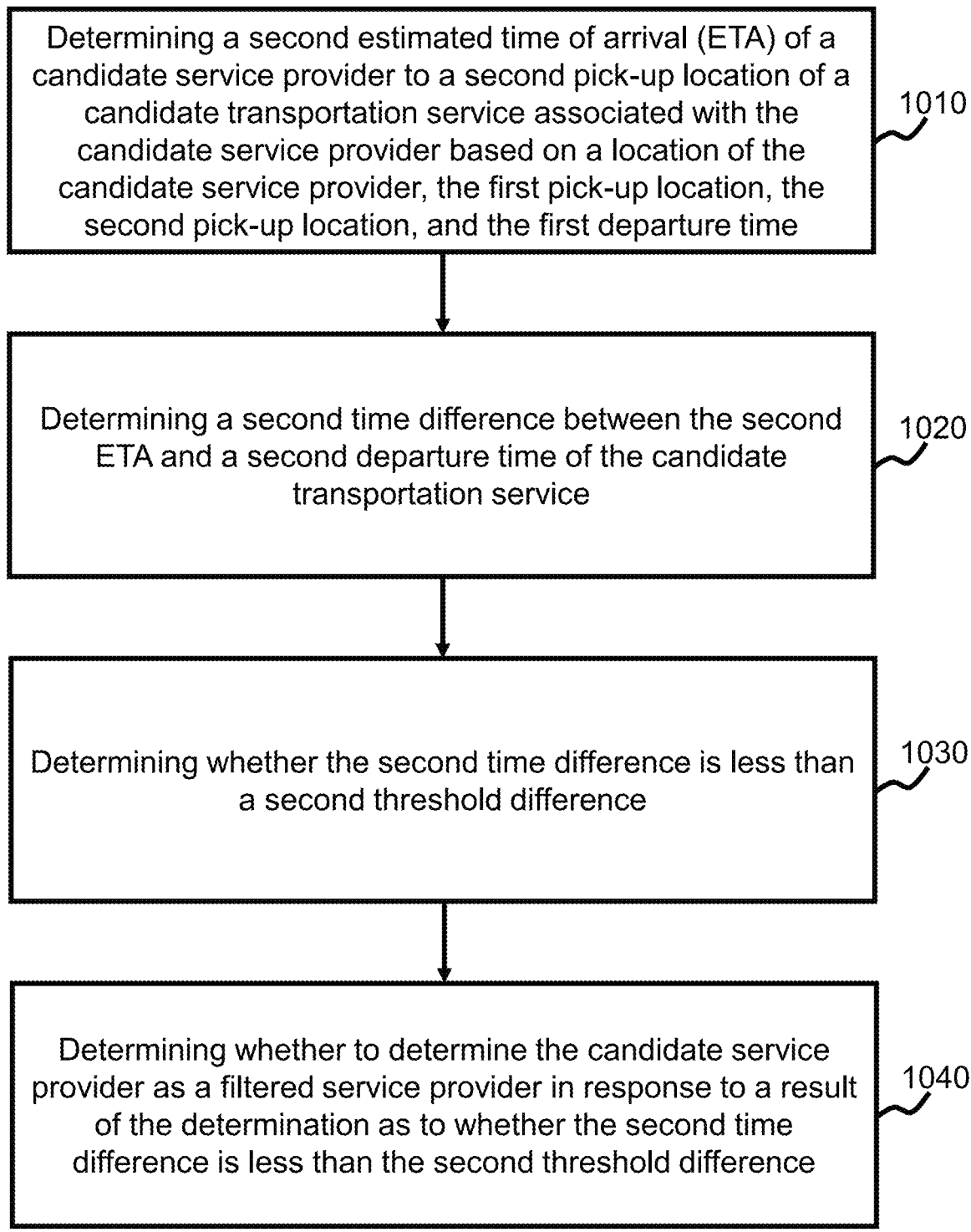
FIG. 10 is a flowchart illustrating an exemplary process of selecting a candidate service provider according to some embodiments of the present disclosure.

FIG. 10 is a flowchart illustrating an exemplary process for selecting a candidate service provider according to some embodiments of the present disclosure. Process 1000 may be implemented in the on-demand service system 100 illustrated in FIG. 1. For example, process 1000 may be stored in the storage device 150 and/or the storage 220 as a form of instructions (e.g., an application), and invoked and/or executed by the server 110 (e.g., the processing engine 112 of the server 110, the processor 210 illustrated in FIG. 2, or one or more modules in the processing engine 112 illustrated in FIG. 4). The operations of the illustrated process presented below are intended to be illustrative. In some embodiments, process 1000 may be accomplished with one or more additional operations not described, and/or without one or more of the operations discussed. Additionally, the order in which the operations of process 1000 as illustrated in FIG. 10 and described below is not intended to be limiting. In some embodiments, step 620 of process 600 illustrated in FIG. 6 may be performed according to process 1000. For one of the one or more candidate service providers, the server 110 may perform process 1000 to determine whether to determine the candidate service provider as a filtered service provider. The server 110 may filter at least one of the one or more candidate service providers one by one or simultaneously.

In 1010, the provider determination module 430 (or the processing engine 112, and/or the processing circuits 210-*b*) may determine a second estimated time of arrival (ETA) of a candidate service provider to a second pick-up location of a candidate transportation service associated with a candidate service provider based on a location of the candidate service provider, the first pick-up location, the second pick-up location, and the first departure time.

In some embodiments, the provider determination module 430 may determine a combination route that passes through the first pick-up location, the first destination, the second destination, and at least one of the second pick-up location and the location of the candidate service provider. For example, if the candidate service provider is on the way to the second pick-up location when the I/O module 410 obtains the pending transportation service, the provider determination module 430 may determine a combination route that passes through the location of the candidate service provider, the second pick-up location, the second destination, the first pick-up location, and the first destination. As another example, if the candidate service provider arrives at the second pick-up location when the I/O module 410 obtains the pending transportation service, the provider determination module 430 may determine a combination route that passes through the second pick-up location, the second destination, the first pick-up location, and the first destination. As still another example, if the candidate service provider is on the way to the second destination when the I/O module 410 obtains the pending transportation service, the provider determination module 430 may determine a combination route that passes through the location of the candidate service provider, the second destination, the first pick-up location, and the first destination. The provider determination module 430 may determine the second ETA of the candidate service provider to the second pick-up location based on a portion of the combination route from the location of the candidate service provider to the second pick-up location.

In some embodiments, if the first pick-up location is between the location of the candidate service provider and the second pick-up location according to the portion of the combination route from the location of the candidate service provider to the second pick-up location, which indicates that the candidate service provider will first pick up the passenger(s) of the pending transportation service, and then pick up the passenger(s) of the candidate transportation service, the provider determination module 430 may determine the second ETA of the candidate service provider to the second pick-up location based on the driving time from the location of the candidate service provider to the first pick-up location, the driving time from the first pick-up location to the second pick-up location, and the first departure time. For example, the current time is 10:00 a.m. (e.g., the time point when the I/O module 410 obtains the pending transportation service), the provider determination module 430 may determine that the driving time from the location of the candidate service provider to the first pick-up location is 5 minutes and the driving time from the first pick-up location to the second pick-up location is 3 minutes. The first departure time is 10:07 a.m. The provider determination module 430 may determine that the second ETA of the candidate service provider to the second pick-up location is 10:10 a.m. As another example, the current time is 10:00 a.m. (e.g., the time point when the I/O module 410 obtains the pending transportation service), the provider determination module 430 may determine that the driving time from the location of the candidate service provider to the first pick-up location is 5 minutes and the driving time from the first pick-up location to the second pick-up location is 3 minutes. The first departure time is 10:02 a.m. The provider determination module 430 may determine that the second ETA of the candidate service provider to the second pick-up location is 10:08 a.m.

In some embodiments, if the first pick-up location is not between the location of the candidate service provider and the second pick-up location according to the portion of the combination route from the location of the candidate service provider to the second pick-up location, which indicates that the candidate service provider will first pick up the passenger(s) of the candidate transportation service, and then pick up the passenger(s) of the pending transportation service, the provider determination module 430 may determine the second ETA of the candidate service provider to the second pick-up location based on the driving time from the location of the candidate service provider to the second pick-up location. For example, the current time is 10:00 a.m. (e.g., the time point when the I/O module 410 obtains the pending transportation service), the provider determination module 430 may determine that the driving time from the location of the candidate service provider to the second pick-up location is 5 minutes. The provider determination module 430 may determine that the second ETA of the candidate service provider to the second pick-up location is 10:05 a.m.

In 1020, the provider determination module 430 (or the processing engine 112, and/or the processing circuits 210-*b*) may determine a second time difference between the second ETA of the candidate service provider to the second pick-up location and a second departure time of the candidate transportation service. In some embodiments, the provider determination module 430 may determine the second time difference by subtracting the second departure time from the second ETA of the candidate service provider to the second pick-up location.

In 1030, the provider determination module 430 (or the processing engine 112, and/or the processing circuits 210-*b*) may determine whether the second time difference is less than a second threshold difference (e.g., 5 minutes). The second threshold difference may be a fixed value or may be adjustable depending on different situations. For example, in rush hour (e.g., 7:00 a.m.-9:00 a.m.), the second threshold difference may be relatively long (e.g., 6 minutes) because it may take a service provider longer time to arrive at the second pick-up location; whereas in other hours (e.g., 10:00 a.m.-12:00 a.m.), the second threshold difference may be relatively short (e.g., 2 minutes) as the service provider may need shorter time to arrive at the second pick-up location.

In 1040, the provider determination module 430 (or the processing engine 112, and/or the processing circuits 210-*b*) may determine whether to determine the candidate service provider as a filtered service provider in response to a result of the determination as to whether the second time difference is less than the second threshold difference. The candidate service provider may be determined as the filtered service provider in response to a determination that the second time difference is less than the second threshold difference. For example, the second ETA of the candidate service provider to the second pick-up location is 9:58 a.m. and the second departure time is 10:00 a.m. The second time difference may be 2 minutes, which is less than the second threshold difference of 5 minutes. The provider determination module 430 may determine the candidate service provider as the filtered service provider. As another example, the second ETA of the candidate service provider to the second pick-up location is 4:52 p.m. and the second departure time is 5:00 p.m. The second time difference may be 8 minutes, which is greater than the second threshold difference of 5 minutes. The provider determination module 430 may not determine the candidate service provider as the filtered service provider.

FIG. 11 is a flowchart illustrating an exemplary process for selecting a candidate service provider according to some embodiments of the present disclosure. Process 1100 may be implemented in the on-demand service system 100 illustrated in FIG. 1. For example, process 1100 may be stored in the storage device 150 and/or the storage 220 as a form of instructions (e.g., an application), and invoked and/or executed by the server 110 (e.g., the processing engine 112 of the server 110, the processor 210 illustrated in FIG. 2, or one or more modules in the processing engine 112 illustrated in FIG. 4). The operations of the illustrated process presented below are intended to be illustrative. In some embodiments, process 1100 may be accomplished with one or more additional operations not described, and/or without one or more of the operations discussed. Additionally, the order in which the operations of process 1100 as illustrated in FIG. 11 and described below is not intended to be limiting. In some embodiments, step 620 of process 600 illustrated in FIG. 6 may be performed according to process 1100. For one of the one or more candidate service providers, the server 110 may perform process 1100 to determine whether to determine the candidate service provider as a filtered service provider. The server 110 may filter at least one of the one or more candidate service providers one by one or simultaneously.

In 1110, the provider determination module 430 (or the processing engine 112, and/or the processing circuits 210-*b*) may determine a count of one or more requests each of which having a pick-up location consistent with the first pick-up location. The one or more requests may have been accepted by a candidate service provider and have not been completed.

In 1120, the provider determination module 430 (or the processing engine 112, and/or the processing circuits 210-*b*) may determine whether the count is less than a threshold count (e.g., 3). The threshold count may be a fixed value or may be adjustable depending on different situations. For example, in rush hour (e.g., 7:00 a.m.-9:00 a.m.), the threshold count may be relatively large (e.g., 4) because the demand of service providers exceeds the supply; whereas in other hours (e.g., 10:00 a.m.-12:00 a.m.), the threshold count may be relatively short (e.g., 2) as the supply of service providers exceeds the demand.

In 1130, the provider determination module 430 (or the processing engine 112, and/or the processing circuits 210-*b*) may determine whether to determine the candidate service provider as a filtered service provider in response to a result of the determination as to whether the count is less than the threshold count. The candidate service provider may be determined as the filtered service provider in response to a determination that the count of the one or more requests each of which having a pick-up location consistent with the first pick-up location is less than the threshold count. For example, the count may be 1, which is less than the threshold count of 3. The provider determination module 430 may determine the candidate service provider as the filtered service provider. As another example, the count may be 4, which is greater than the threshold count of 3. The provider determination module 430 may not determine the candidate service provider as the filtered service provider.

In some embodiments, the provider determination module 430 may determine the one or more filtered service providers based on any combination of processes 700-1100. For example, the provider determination module 430 may first filter out one or more working service providers in the one or more candidate service providers based on process 700. The provider determination module 430 may then filter out, based on process 800, one or more of the remaining working service providers after process 700 is performed. The provider determination module 430 may determine the remaining working service providers after processes 700 and 800 are performed as the filtered service providers.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer-readable media having computer readable program code embodied thereon.

A computer readable signal medium may include a propagated data signal with computer readable program code embodied therein, for example, in baseband or as part of a carrier wave. Such a propagated signal may take any of a variety of forms, including electromagnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object-oriented programming language such as Java, Scala, Smalltalk, Eiffel, JADE, Emerald, C++, C #, VB. NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software-only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

I claim:

1. A method for carpool services implemented on a computing device having at least one processor and at least one storage device, the method comprising:
    obtaining a pending transportation service requested by a service requester of a plurality of service requesters, the pending transportation service including a first origin and a first destination;
    determining a first pick-up location and a first departure time from the first pick-up location for the pending transportation service based on the first origin and the first destination; and
    determining a target service provider from a plurality of candidate service providers based on the pending transportation service and a shareable transportation service that has been accepted by the target service provider and has not been completed, wherein determining the target service provider from the plurality of candidate service providers based on the pending transportation service and the shareable transportation service includes:
        determining a count of one or more requests each of which having a pick-up location consistent with the first pick-up location, the one or more requests having been accepted by at least one of the plurality of candidate service providers and having not been completed;
        determining whether the count is less than a threshold count;
        determining a first direction from a location of the at least one of the plurality of candidate service providers to the first pick-up location;
        determining a second direction from the location of the at least one of the plurality of candidate service providers to a second destination of a candidate transportation service associated with the at least one of the plurality of candidate service providers, the candidate transportation service being a shareable transportation service that the at least one of the plurality of candidate service provides has been accepted and has not been completed;
        determining an angle between the first direction and the second direction;
        determining whether the angle is less than a threshold angle;
        determining the at least one of the plurality of candidate service providers as one or more filtered service providers in response to determining that the count is less than the threshold count and the angle is less than the threshold angle; and
        determining the target service provider from the one or more filtered service providers;
    obtaining provider information of the target service provider by tracking and receiving real-time locations of the target service provider from a positioning system in a mobile terminal of the target service provider; and
    online sending the first pick-up location and the provider information to a mobile terminal of the service requester in real time, directing the mobile terminal of the service requester to display the first pick-up location and the provider information on a map.

2. The method of claim 1, the method further comprising transmitting information relating to the target service provider to the service requester.

3. The method of claim 1, wherein determining the target service provider from the plurality of candidate service providers based on the pending transportation service and the shareable transportation service comprises:
    determining the plurality of candidate service providers based on the first pick-up location and a location of each of the plurality of candidate service providers;
    determining the one or more filtered service providers by filtering the plurality of candidate service providers based on at least one of: the first pick-up location, the first departure time, the first destination, a second pick-up location of the candidate transportation service associated with the at least one of the plurality of candidate service providers, a second departure time from the second pick-up location of the candidate transportation service, the second destination of the candidate transportation service, or the location of the at least one of the plurality of candidate service providers; and
    determining the target service provider from the one or more filtered service providers.

4. The method of claim 3, wherein a distance between the first pick-up location and the location of each of the plurality of candidate service providers is less than a predetermined distance, or a driving time from the location of each of the plurality of candidate service providers to the first pick-up location is less than a predetermined time period.

5. The method of claim 4, wherein determining the one or more filtered service providers from the plurality of candidate service providers comprises:
    determining a first original route based on the first pick-up location and the first destination;

determining a first sharing route based on the first pick-up location, the first destination, the second destination of the candidate transportation service associated with the at least one of the plurality of candidate service providers, and at least one of the second pick-up location and the location of the at least one of the plurality of candidate service providers;

comparing the first original route with the first sharing route;

determining a second original route based on the location of the at least one of the plurality of candidate service providers and the second destination;

determining a second sharing route based on the first pick-up location, the first destination, the second destination, and at least one of the second pick-up location and the location of the at least one of the plurality of candidate service providers;

comparing the second original route with the second sharing route; and determining whether to determine the at least one of the plurality of candidate service providers as the filtered service provider based on a result of the comparison between the first original route and the first sharing route, and a result of the comparison between the second original route and the second sharing route.

6. The method of claim 4, wherein determining the one or more filtered service providers from the plurality of candidate service providers comprises:

determining an estimated time of arrival (ETA) of the at least one of the plurality of candidate service providers to the first pick-up location based on the location of the at least one of the plurality of candidate service providers, the first pick-up location, the second pick-up location, and the second departure time;

determining a time difference between the ETA of the at least one of the plurality of candidate service providers to the first pick-up location and the first departure time;

determining whether the time difference is less than a threshold difference; and determining whether to select the at least one of the plurality of candidate service providers as the filtered service provider in response to a result of the determination as to whether the time difference is less than the threshold difference.

7. The method of claim 4, wherein determining the one or more filtered service providers from the plurality of candidate service providers comprises:

determining an estimated time of arrival (ETA) of the at least one of the plurality of candidate service providers to the second pick-up location based on the location of the at least one of the plurality of candidate service providers, the first pick-up location, the first departure time, and the second pick-up location;

determining a time difference between the ETA of the at least one of the plurality of candidate service providers to the second pick-up location and the second departure time;

determining whether the time difference is less than a threshold difference; and determining whether to select the at least one of the plurality of candidate service providers as the filtered service provider in response to a result of the determination as to whether the time difference is less than the threshold difference.

8. The method of claim 1, the method further comprising transmitting the pending transportation service to the target service provider.

9. The method of claim 1, wherein the threshold angle is 90°.

10. A system for carpool services, comprising:

one or more storage devices storing a set of instructions; and one or more processors configured to communicate with the one or more storage devices, wherein when executing the set of instructions, the one or more processors are configured to cause the system to:

obtain a pending transportation service requested by a service requester of a plurality of service requesters, the pending transportation service including a first origin and a first destination;

determine a first pick-up location and a first departure time from the first pick-up location for the pending transportation service based on the first origin and the first destination; and determine a target service provider from a plurality of candidate service providers based on the pending transportation service and a shareable transportation service that has been accepted by the target service provider and has not been completed, wherein determining the target service provider from the plurality of candidate service providers based on the pending transportation service and the shareable transportation service includes:

determining a count of one or more requests each of which having a pick-up location consistent with the first pick-up location, the one or more requests having been accepted by at least one of the plurality of candidate service providers and having not been completed;

determining whether the count is less than a threshold count;

determining a first direction from a location of the at least one of the plurality of candidate service providers to the first pick-up location;

determining a second direction from the location of the at least one of the plurality of candidate service providers to a second destination of a candidate transportation service associated with the at least one of the plurality of candidate service providers, the candidate transportation service being a shareable transportation service that the at least one of the plurality of candidate service provides has been accepted and has not been completed;

determining an angle between the first direction and the second direction;

determining whether the angle is less than a threshold angle;

determining the at least one of the plurality of candidate service providers as one or more filtered service providers in response to determining that the count is less than the threshold count and the angle is less than the threshold angle; and determining the target service provider from the one or more filtered service providers;

obtaining provider information of the target service provider by tracking and receiving real-time locations of the target service provider from a positioning system in a mobile terminal of the target service provider; and online sending the first pick-up location and the provider information to a mobile terminal of the service requester in real time, directing the mobile terminal of the service requester to display the first pick-up location and the provider information on a map.

11. The system of claim 10, wherein the one or more processors are further configured to cause the system to transmit information relating to the target service provider to the service requester.

12. The system of claim 10, wherein to determine the target service provider from the plurality of candidate service providers based on the pending transportation service and the shareable transportation service, the one or more processors are configured to cause the system to:
determine the plurality of candidate service providers based on the first pick-up location and a location of each of the plurality of candidate service providers;
determine the one or more filtered service providers by filtering the plurality of candidate service providers based on at least one of: the first pick-up location, the first departure time, the first destination, a second pick-up location of the candidate transportation service associated with the at least one of the one or more candidate service providers, a second departure time from the second pick-up location of the candidate transportation service, the second destination of the candidate transportation service, or the location of the at least one of the plurality of candidate service providers; and
determine the target service provider from the one or more filtered service providers.

13. The system of claim 12, wherein a distance between the first pick-up location and the location of each of the plurality of candidate service providers is less than a predetermined distance, or a driving time from the location of each of the plurality of candidate service providers to the first pick-up location is less than a predetermined time period.

14. The system of claim 13, wherein to determine the plurality of filtered service providers from the one or more candidate service providers, the one or more processors are configured to cause the system to:
determine a first original route based on the first pick-up location and the first destination;
determine a first sharing route based on the first pick-up location, the first destination, the second destination of the candidate transportation service associated with the at least one of the plurality of candidate service providers, and at least one of the second pick-up location and the location of the at least one of the plurality of candidate service providers;
compare the first original route with the first sharing route;
determine a second original route based on the location of the at least one of the one or more candidate service providers and the second destination;
determine a second sharing route based on the first pick-up location, the first destination, the second destination, and at least one of the second pick-up location and the location of the at least one of the plurality of candidate service providers;
compare the second original route with the second sharing route; and
determine whether to determine the at least one of the plurality of candidate service providers as the filtered service provider based on a result of the comparison between the first original route and the first sharing route, and a result of the comparison between the second original route and the second sharing route.

15. The system of claim 13, wherein to determine the plurality of filtered service providers from the one or more candidate service providers, the one or more processors are configured to cause the system to:
determine an estimated time of arrival (ETA) of the at least one of the plurality of candidate service providers to the first pick-up location based on the location of the at least one of the one or more candidate service providers, the first pick-up location, the second pick-up location, and the second departure time;
determine a time difference between the ETA of the at least one of the plurality of candidate service providers to the first pick-up location and the first departure time;
determine whether the time difference is less than a threshold difference; and
determine whether to select the at least one of the plurality of candidate service providers as the filtered service provider in response to a result of the determination as to whether the time difference is less than the threshold difference.

16. The system of claim 13, wherein to determine the one or more filtered service providers from the plurality of candidate service providers, the one or more processors are configured to cause the system to
determine an estimated time of arrival (ETA) of the at least one of the plurality of candidate service providers to the second pick-up location based on the location of the at least one of the plurality of candidate service providers, the first pick-up location, the first departure time, and the second pick-up location;
determine a time difference between the ETA of the at least one of the plurality of candidate service providers to the second pick-up location and the second departure time;
determine whether the time difference is less than a threshold difference; and
determine whether to select the at least one of the plurality of candidate service providers as the filtered service provider in response to a result of the determination as to whether the time difference is less than the threshold difference.

17. The system of claim 10, wherein the one or more processors are further configured to cause the system to:
transmit the pending transportation service to the target service provider.

18. The system of claim 10, wherein the threshold angle is 90°.

19. A non-transitory computer readable medium, comprising at least one set of instructions, wherein when executed by one or more processors of a computing device, the at least one set of instructions causes the computing device to perform a method, the method comprising:
obtaining a pending transportation service requested by a service requester of a plurality of service requesters, the pending transportation service including a first origin and a first destination;
determining a first pick-up location and a first departure time from the first pick-up location for the pending transportation service based on the first origin and the first destination; and
determining a target service provider from a plurality of candidate service providers based on the pending transportation service and a shareable transportation service that has been accepted by the target service provider and has not been completed, wherein determining the target service provider from the plurality of candidate service providers based on the pending transportation service and the shareable transportation service includes:

determining a count of one or more requests each of which having a pick-up location consistent with the first pick-up location, the one or more requests having been accepted by at least one of the plurality of candidate service providers and having not been completed;

determining whether the count is less than a threshold count;

determining a first direction from a location of the at least one of the plurality of candidate service providers to the first pick-up location;

determining a second direction from the location of the at least one of the plurality of candidate service providers to a second destination of a candidate transportation service associated with the at least one of the plurality of candidate service providers, the candidate transportation service being a shareable transportation service that the at least one of the plurality of candidate service provides has been accepted and has not been completed;

determining an angle between the first direction and the second direction;

determining whether the angle is less than a threshold angle;

determining the at least one of the plurality of candidate service providers as one or more filtered service providers in response to determining that the count is less than the threshold count and the angle is less than the threshold angle; and determining the target service provider from the one or more filtered service providers;

obtaining provider information of the target service provider by tracking and receiving real-time locations of the target service provider from a positioning system in a mobile terminal of the target service provider; and online sending the first pick-up location and the provider information to a mobile terminal of the service requester in real time, directing the mobile terminal of the service requester to display the first pick-up location and the provider information on a map.

20. The non-transitory computer readable medium of claim 19, wherein a distance between the first pick-up location and the location of each of the plurality of candidate service providers is less than a predetermined distance, or a driving time from the location of each of the plurality of candidate service providers to the first pick-up location is less than a predetermined time period.

* * * * *